United States Patent [19]
Sakurai

[11] Patent Number: 6,130,962
[45] Date of Patent: Oct. 10, 2000

[54] INFORMATION RETRIEVAL APPARATUS FOR ENABLING INFORMATION RETRIEVAL WITH AMBIGUOUS RETRIEVAL KEY

[75] Inventor: Yasuhiro Sakurai, Nishinomiya, Japan

[73] Assignee: Matsushita Electric Industrial Co., Ltd., Osaka, Japan

[21] Appl. No.: 09/090,703

[22] Filed: Jun. 4, 1998

[30] Foreign Application Priority Data

Jun. 6, 1997 [JP] Japan .................................. 9-149569
May 12, 1998 [JP] Japan .................................. 10-128725

[51] Int. Cl.[7] .............................. G06K 9/00; G06K 9/46; G06K 9/60; H04N 1/00; G06F 7/00
[52] U.S. Cl. ........................ 382/190; 382/181; 382/187; 382/190; 382/306; 358/403; 707/3; 707/4
[58] Field of Search .................................. 382/186, 187, 382/190, 305, 306, 181; 358/403, 404; 707/3, 4, 6

[56] References Cited

U.S. PATENT DOCUMENTS

| | | | |
|---|---|---|---|
| 4,672,683 | 6/1987 | Matsueda ................................. | 382/305 |
| 5,109,439 | 4/1992 | Froessl .................................... | 382/305 |
| 5,553,284 | 9/1996 | Barbara et al. .......................... | 707/4 |
| 5,572,726 | 11/1996 | Hasuo .................................... | 382/305 |
| 5,586,197 | 12/1996 | Tsujimura et al. ...................... | 382/305 |
| 5,805,746 | 9/1998 | Miyatake et al. ...................... | 382/190 |
| 5,809,498 | 9/1998 | Lopresti et al. ........................ | 707/6 |
| 5,815,704 | 9/1998 | Shimotsuji et al. .................... | 382/190 |
| 5,860,075 | 1/1999 | Hashizume et al. ................... | 382/190 |

FOREIGN PATENT DOCUMENTS

| | | |
|---|---|---|
| 60-136890 | 7/1985 | Japan . |
| 60-136892 | 7/1985 | Japan . |
| 7110845 | 4/1995 | Japan . |
| 7295733 | 11/1995 | Japan . |
| 7319924 | 12/1995 | Japan . |
| 850632 | 2/1996 | Japan . |

OTHER PUBLICATIONS

Gross, et al "Diagram Query & Image Retrieval In Design", IEEE, pp. 308–311, Sep. 1995.

Eakins, et al "Retrieval Of Trade Mark Images By Shape Feature –The Artisan Projet", IEEE, pp. 1–6, 1996.

Primary Examiner—Phuoc Tran
Assistant Examiner—Daniel G. Mariam
Attorney, Agent, or Firm—Price and Gess

[57] ABSTRACT

An input unit outputs handwritten data as stroke data to a control unit. The control unit stores the outputted stroke data in a handwritten memo database without recognizing the handwritten data as character code data, and stores stroke data of a retrieval mark in a mark database. The control unit classifies stroke data sets in each page into categories, such as characters and figures, and stores the classification result as retrieval information in the handwritten memo database. On receiving an indication of a retrieval mark or an indication of a retrieval key related to page contents, such as character contents or figure contents, from the input unit, the control unit searches the mark database or the handwritten memo database, and makes a display unit display handwritten data in the pages matching the indication.

20 Claims, 28 Drawing Sheets

| REGISTERED MARK | RELATED PAGE HEADER |
|---|---|
| 1 | 12, 16, 34, ⋯ |
| 2 | 3, 8, 25, ⋯ |
| 3 | 5, 29, 43, ⋯ |
| 4 | 9, 39, 46, ⋯ |

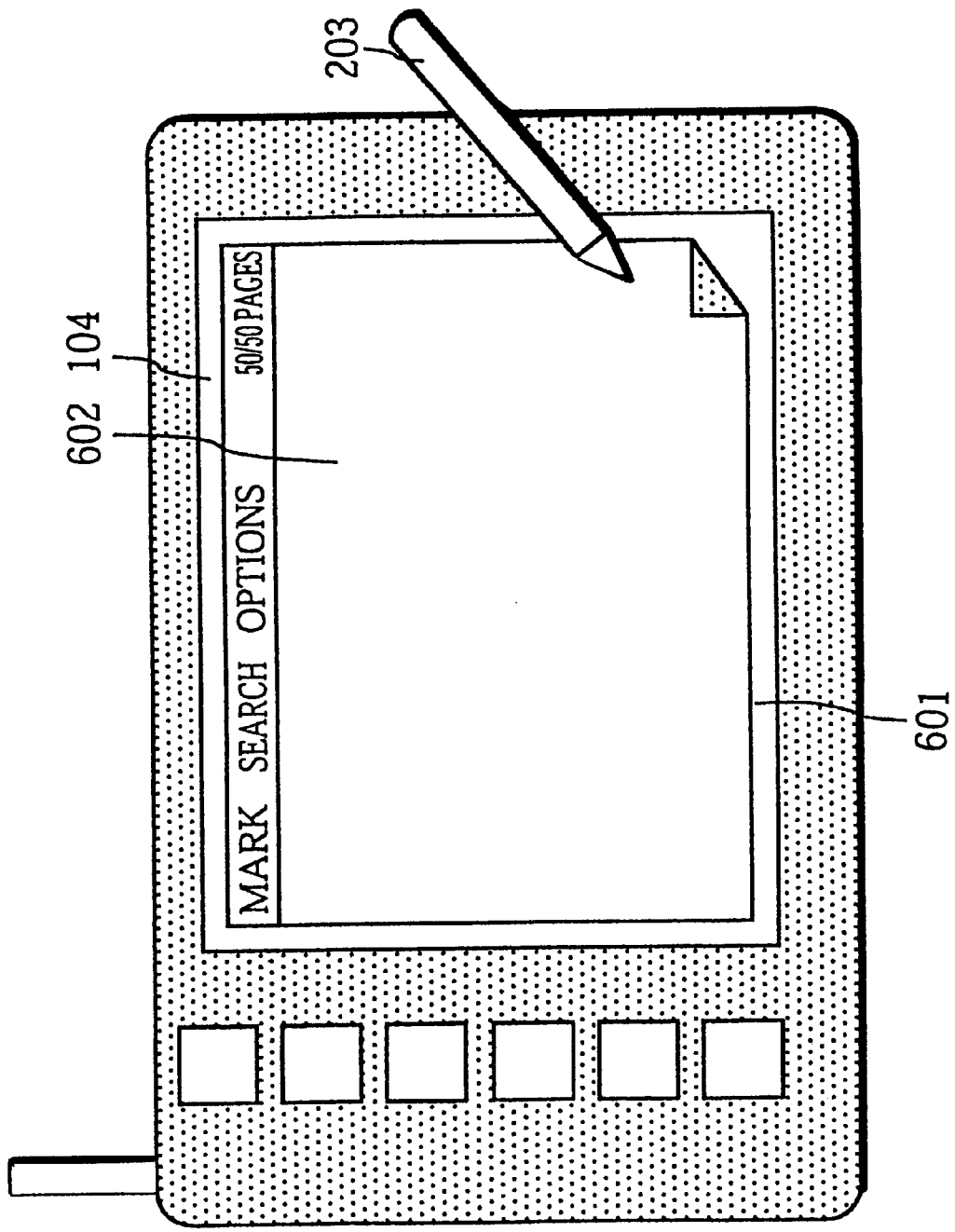

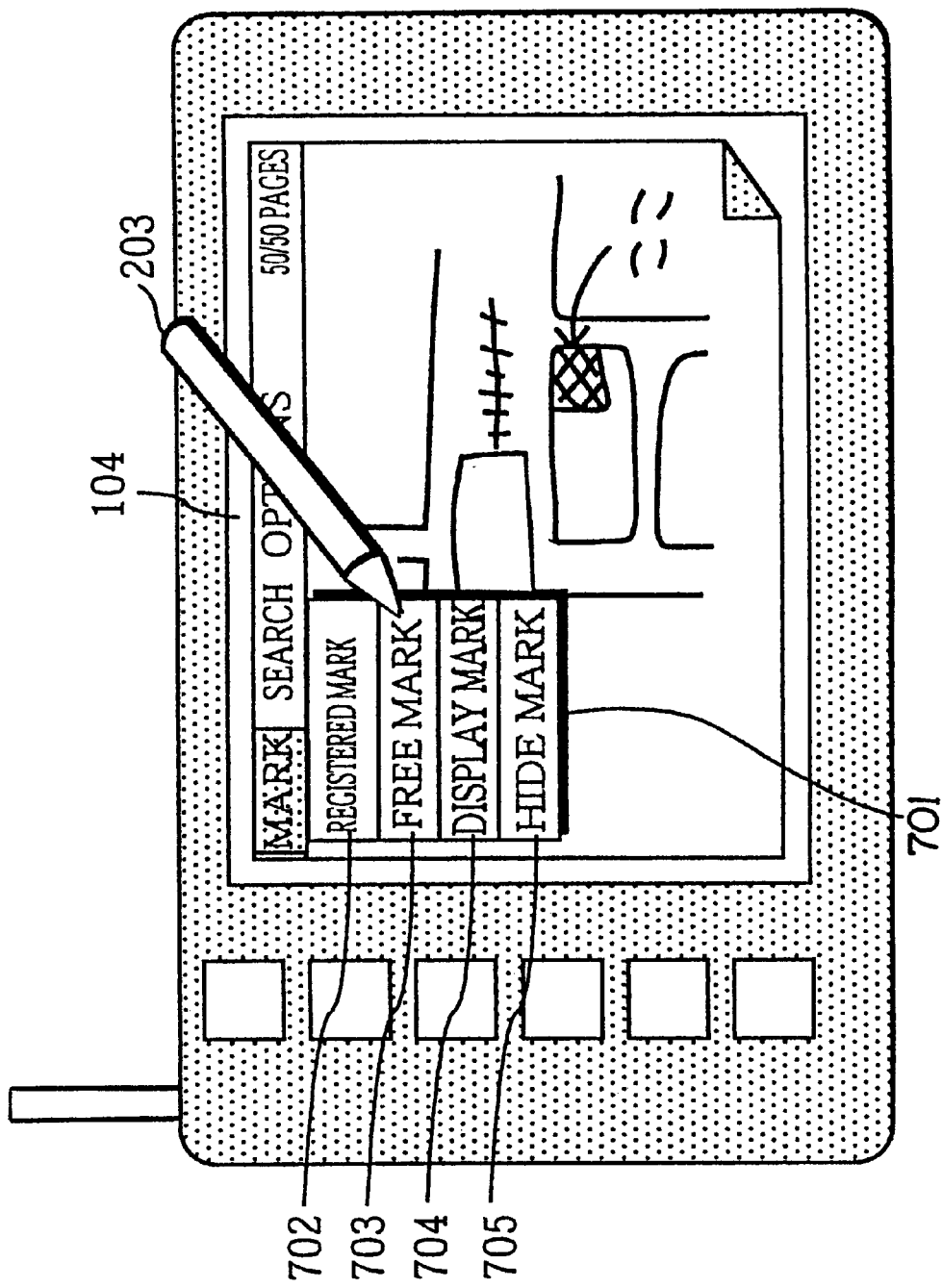

INFORMATION RETRIEVAL APPARATUS FOR ENABLING INFORMATION RETRIEVAL WITH AMBIGUOUS RETRIEVAL KEY

BACKGROUND OF THE INVENTION (1) Field of the Invention

The present invention relates to an information retrieval apparatus for retrieving and displaying handwritten data, which has been inputted from a handwritten data input unit such as a tablet and is accumulated in a storage unit, according to a designation from a user.

(2) Related Art

In recent years, as information processing apparatuses have been downsized and made increasingly portable, apparatuses for allowing a user to input handwritten data using input devices, such as a combination of a pen and a tablet, have become widely used. These apparatuses adopt various data storing methods. For instance, with one data storing method, handwritten data is inputted in a predetermined character input field, is subjected to a character recognition process, and is stored as a character code. With another data storing method, manuscript handwriting is stored in its inputted form, as the case where a handwritten character is written on paper with a pencil.

With the former method, although retrieval of the inputted data can be performed easily and accurately due to character codes, a user cannot input handwritten data freely and speedily, unlike when using paper and a pencil. This is because the inputted handwritten data needs to be enough accurate for a character recognition process. On the other hand, with the latter method, although a user can input handwritten data speedily, the retrieval of the inputted handwritten data is difficult.

Japanese Laid-Open Patent Application No.7-110845 discloses an information retrieval apparatus that is able to display registered handwritten data in its inputted form. With the apparatus, although handwritten data is stored as it is, handwritten data to be registered and handwritten data used as a retrieval key are both subjected to a character recognition process and are converted into character codes that are used during the retrieval process.

With the apparatus, both the handwritten data to be registered and the handwritten data used as the retrieval key need to be subjected to a character recognition process wherein a plurality of candidate character strings are obtained for the handwritten data and are compared with the handwritten data. This requires considerable processing time, and means that the apparatus needs an extra storage area for storing the obtained potential character strings. Also, since character codes are used for retrieval, handwritten data must be accurate enough for the character recognition process to succeed.

SUMMARY OF THE INVENTION

With regard to the above problems, the object of the present invention is to provide an information retrieval apparatus which enables handwritten data retrieval with an ambiguous retrieval key without increasing retrieval process time.

The above object is achieved by an information retrieval apparatus including: a handwritten input receiving unit for receiving a handwritten input made by an operator; a stroke data set extracting unit for extracting at least one stroke data set, which is a collection of data for strokes in the handwritten input made by the operator; a storage unit for storing each extracted stroke data set; a retrieval information receiving unit for receiving retrieval information inputted by the operator; a retrieval unit for retrieving stroke data sets from the storage unit according to a degree to which respective contents of the stroke data sets match a content of the received retrieval information; and a display unit for reading and displaying the retrieved stroke data sets. With this structure, desired handwritten data can be effectively retrieved using an ambiguous retrieval key without recognizing the handwritten data as character codes.

Here, the stroke data set extracting unit may include an identifier assigning unit for assigning an identifier to the stroke data sets in predetermined groups, where the storage unit stores each predetermined group of the stroke data sets together with a corresponding identifier. The information retrieval apparatus may further include: a design appending unit for appending a design to one of the predetermined groups of stroke data sets, in accordance with an indication given by the operator; and a design management information generating unit for generating design management information which has each design that has been appended by the design appending unit associated with an identifier of each predetermined group of stroke data sets appended the design. The storage unit may include a design management information storage unit for storing the design management information. The retrieval unit may include an identifier extracting unit which searches, when the retrieval information receiving unit has received a retrieval design as the retrieval information, the design management information stored in the design management information storage unit and extracts each identifier that is associated with a design having a predetermined degree of similarity to the retrieval design, where the display unit reads and displays each predetermined group of stroke data sets with an identifier that has been extracted by the identifier extracting unit. With this structure, a design can be appended to one predetermined group of the stroke data sets, and each predetermined group appended a design that has a predetermined degree of similarity to an indicated retrieval design can be displayed. As a result, the handwritten data does not need to be recognized as characters and therefore retrieval process can be performed at high speed.

Here, the design appending unit may include: a design list storage unit for storing a ready-made list of designs to be appended to the predetermined groups of the stroke data sets; a design list display control unit for reading the list from the design list storage unit and having the display unit display a window to display the list therein; and a design receiving unit for receiving, from the operator, an indication of a design out of the list displayed on the display unit, where, when the retrieval information receiving unit receives a design out of the list stored in the design list storage unit as the retrieval design, the identifier extracting unit extracts identifiers associated with a design that matches the retrieval design. With this structure, a design can be easily appended to one predetermined group.

Here, the design appending unit may further include: a design input receiving unit for receiving a handwritten design inputted by the operator; a design stroke data set extracting unit for extracting a design stroke data set which is a collection of data for strokes in the handwritten design inputted by the operator; a design stroke data set storage unit for storing design stroke data sets extracted by the design stroke data set extracting unit; and a design characteristic extracting unit for extracting characteristics of each design stroke data set stored in the design stroke data set storage unit. The design management information generating unit may further include: an associating unit for associating characteristics of each design stroke data set extracted by the design stroke data set extracting unit with an identifier of each predetermined group of stroke data sets appended the design stroke data set. The storage unit may further include: an association storage unit for storing design management information which associates characteristics of each design stroke data set extracted by the design characteristic extracting unit, the design stroke data set stored in the design stroke data set storage unit, and the identifiers associated with the characteristics by the associating unit. The retrieval unit may include: a retrieval design stroke data set extracting unit for extracting, when the retrieval information receiving unit receives a retrieval handwritten design inputted by the operator, a retrieval design stroke data set, which is a collection of data for strokes, from the retrieval handwritten design; a retrieval design stroke data set storage unit for storing the retrieval design stroke data set extracted by the retrieval design stroke data set extracting unit; a retrieval design characteristic extracting unit for extracting retrieval characteristics of the retrieval design stroke data set; a design selection unit for comparing characteristics of each design stroke data set in the design management information stored in the association storage unit with the retrieval characteristics, and for selecting at least one of the design stroke data sets according to a degree of similarity between the design stroke data set and the retrieval handwritten design; and a selected identifier extracting unit for extracting identifiers associated with the design stroke data set selected by the design selection unit. With this structure, handwritten design can be freely appended to one predetermined group and the operator can retrieve handwritten data using the handwritten design given by the operator so that the operator can perform retrieval efficiently.

Here, data for each stroke in a handwritten design is expressed by coordinate points that are detected at a predetermined interval, and the design characteristic extracting unit detects a direction of at least one straight line that passes a plurality of coordinate points in a stroke and a direction of a straight line which joins an end point of a stroke with a start point of a next stroke, and converts the detected directions into normalized codes. With this structure, a design that has been freely written can be recognized accurately.

Here, data for each stroke in a retrieval handwritten design is expressed by coordinate points that are detected at a predetermined interval, and the retrieval design characteristic extracting unit detects a direction of at least one straight line that passes a plurality of coordinate points in a stroke in the retrieval handwritten design and a direction of a straight line which joins an end point of a stroke with a start point of a next stroke in the retrieval handwritten design, and converts the detected directions into normalized codes, where the design selection unit calculates a degree of similarity between the codes obtained by the design characteristic extracting unit with the codes obtained by the retrieval design extracting unit using a dynamic programming matching method. With this structure, a degree of similarity between each design appended to handwritten data and a retrieval design is calculated so that accurate retrieval can be performed.

Here, the information retrieval apparatus may further include: a design display receiving unit for receiving an instruction as to whether to have the display unit display the design appended by the design appending unit, where when the design display receiving unit receives an instruction to have the design displayed, the display unit reads and displays, in addition to displaying a stroke data set, one of an appended design stored in the design list storage unit and an appended design stroke data set stored in the design stroke data set storage unit. With this structure, a design appended to a predetermined group can be displayed with the predetermined group.

Here, the design selection unit selects at least one design stroke data set with a degree of similarity that exceeds a predetermined threshold value. With this structure, even if there are similar designs, only a desired predetermined group can be appropriately displayed.

The above object is also achieved by an information retrieval apparatus which further includes: a classification unit for classifying each stroke data set extracted by the stroke data set extracting unit as one of a character and a figure; a calculating unit for calculating a character ratio and a figure ratio for each predetermined group of stroke data sets, the character ratio being found by dividing a total number of strokes in stroke data sets in a predetermined group that have been classified as characters by a total number of strokes included in all stroke data sets in the predetermined group, and the figure ratio by dividing a total number of strokes in stroke data sets within a predetermined group that have been classified as figures by a total number of strokes included in all stroke data sets in the predetermined group; and a retrieval menu display controlling unit for having the display unit display respective retrieval menu items for characters and figures that respectively have retrieval performed according to the character ratio and figure ratio calculated by the calculating unit. The stroke data set extracting unit may include an identifier assigning unit for assigning an identifier to the stroke data sets in predetermined groups, where the storage unit stores each predetermined group of the stroke data sets together with a corresponding identifier. The storage unit may include: a characteristic storage unit for storing a combination of the character ratio and the figure ratio calculated by the calculating unit together with an identifier of the predetermined group for which the combination was calculated, where the retrieval information received by the retrieval information receiving unit is a designation of one of the retrieval menu item for characters and the retrieval menu item for figures. The retrieval unit extracts an identifier of each predetermined group whose character ratio is equal to or greater than a predetermined value when the retrieval information receiving unit receives a designation of the retrieval menu item for characters, and extracts an identifier of each predetermined group whose figure ratio is equal to or greater than a predetermined value when the retrieval information receiving unit receives a designation of the retrieval menu item for figures, and the display unit reads from the storage unit and displays the predetermined groups corresponding to the identifiers extracted by the retrieval unit. With this structure, each predetermined group including a large number of character contents or figure contents can be retrieved and displayed, according to an instruction given by the operator.

Here, the classification unit may include: a character classification unit for classifying each stroke data set that has been classified as a character as one of a Chinese character and a numeral, according to whether a number of strokes that composes a character of the stroke data set exceeds a predetermined threshold value; a first calculating unit for calculating a number of Chinese characters and a number of numerals in each predetermined group of stroke data sets; and a first additional writing unit for writing the number of Chinese characters and the number of numerals calculated by the first calculating unit into the characteristic storage unit so as to correspond to an identifier of the predetermined group for which the number of Chinese characters and the number of numerals were calculated. The retrieval menu display controlling unit may include a first auxiliary menu display control unit for having the display unit display a Chinese character auxiliary menu item for retrieving predetermined groups of the stroke data sets according to the number of Chinese characters and a numeral auxiliary menu item for retrieving predetermined groups of the stroke data sets according to the number of numerals. The retrieval unit may include a first extracting unit for extracting an identifier of each predetermined group whose number of Chinese characters is equal to or greater than a predetermined value when the retrieval information receiving unit receives the Chinese character auxiliary menu, and extracting an identifier of each predetermined group whose number of numerals is equal to or greater than a predetermined value when the retrieval information receiving unit receives the numeral auxiliary menu. With this structure, each predetermined group including a large number of Chinese character contents or numeric contents can be retrieved and displayed, according to an instruction given by the operator.

Here, the classification unit may further include: a segment classification unit for classifying each stroke data set that has been classified as a character as one of a word and a single character, according to whether a number of segments that composes a character of the stroke data set exceeds a predetermined threshold value; a second calculating unit for calculating a number of words and a number of single characters in each predetermined group of stroke data sets; and a second additional writing unit for writing the number of words and the number of single characters calculated by the second calculating unit into the characteristic storage unit so as to correspond to an identifier of the predetermined group for which the number of words and the number of single characters were calculated. The retrieval menu display controlling unit may further include a second auxiliary menu display control unit for having the display unit display a word auxiliary menu item for retrieving predetermined groups of the stroke data sets according to the number of words and a single character auxiliary menu item for retrieving predetermined groups of the stroke data sets according to the number of single characters. The retrieval unit may further include a second extracting unit for extracting an identifier of each predetermined group whose number of words is equal to or greater than a predetermined value when the retrieval information receiving unit receives the word auxiliary menu, and extracting an identifier of each predetermined group whose number of single characters is equal to or greater than a predetermined value when the retrieval information receiving unit receives the single character auxiliary menu. With this structure, each predetermined group including a large number of word contents or single character contents can be retrieved and displayed, according to an instruction given by the operator.

Here, the classification unit may further include: a figure classification unit for classifying each stroke data set that has been classified as a figure and conforms to a predetermined condition as one of an oval, a rectangle, and a straight line; a third calculating unit for calculating a number of ovals, a number of rectangles, and a number of straight lines in each predetermined group of stroke data sets; and a third additional writing unit for writing the number of ovals, the number of rectangles, and the number of straight lines calculated by the third calculating unit into the characteristic storage unit so as to correspond to an identifier of the predetermined group for which the number of ovals, the number of rectangles, and the number of straight lines were calculated. The retrieval menu display controlling unit may further include a third auxiliary menu display control unit for having the display unit display an oval auxiliary menu item for retrieving predetermined groups of the stroke data sets according to the number of ovals, a rectangle auxiliary menu item for retrieving predetermined groups of the stroke data sets according to the number of rectangles, and a straight line auxiliary menu item for retrieving predetermined groups of the stroke data sets according to the number of straight lines. The retrieval unit may further include a third extracting unit for extracting an identifier of each predetermined group whose number of ovals is equal to or greater than a predetermined value when the retrieval information receiving unit receives the oval auxiliary menu, extracting an identifier of each predetermined group whose number of rectangles is equal to or greater than a predetermined value when the retrieval information receiving unit receives the rectangle auxiliary menu, and extracting an identifier of each predetermined group whose number of straight lines is equal to or greater than a predetermined value when the retrieval information receiving unit receives the straight line auxiliary menu. With this structure, each predetermined group including a large number of ovals, rectangles, or lines can be retrieved and displayed, according to an instruction given by the operator.

Here, the classification unit may further include: a length-to-width ratio classification unit for classifying each stroke data set that has been classified as a character as one of a word and a single character, according to whether a length-to-width ratio of a character of the stroke data set exceeds a predetermined threshold value; a fourth calculating unit for calculating a number of words and a number of single characters in each predetermined group of stroke data sets; and a fourth additional writing unit for writing the number of words and the number of single characters calculated by the fourth calculating unit into the characteristic storage unit so as to correspond to an identifier of the predetermined group for which the number of words and the number of single characters were calculated. The retrieval menu display controlling unit may further include a fourth auxiliary menu display control unit for having the display unit display a word auxiliary menu item for retrieving predetermined groups of the stroke data sets according to the number of words and a single character auxiliary menu item for retrieving predetermined groups of the stroke data sets according to the number of single characters. The retrieval unit may further include a fourth extracting unit for extracting an identifier of each predetermined group whose number of words is equal to or greater than a predetermined value when the retrieval information receiving unit receives the word auxiliary menu, and extracting an identifier of each predetermined group whose number of single characters is equal to or greater than a predetermined value when the retrieval information receiving unit receives the single character auxiliary menu. With this structure, each predetermined group including a large number of word contents or single character contents can be retrieved and displayed, according to an instruction given by the operator.

The above object is further achieved by an information retrieval apparatus including: an image data obtaining unit for obtaining image data sets from outside; an image data storage unit for assigning an identifier to each image data set and storing the image data set with the assigned identifier; a design appending unit for appending a design to one of the image data sets, in accordance with an indication given by the operator; a design management information generating unit for generating design management information which has each design that has been appended by the design appending unit associated with an identifier of each image data set appended the design; a design management information storage unit for storing the design management information; a retrieval information receiving unit for receiving a retrieval design inputted by an operator as retrieval information; an extracting unit for extracting each identifier that is associated with a design having a predetermined degree of similarity to the retrieval design; and a display unit reads from the image data storage unit and displays each image data set with an identifier that has been extracted by the identifier extracting unit. With this structure, a design can be appended to one obtained image data set, which allows an image data to be retrieved using the appended design as a retrieval key at high speed.

The above object is still achieved by a computer-readable recording medium which records a program for having an information retrieval apparatus execute an information retrieval process including: a handwritten input receiving step for receiving a handwritten input made by an operator; a stroke data set extracting step for extracting at least one stroke data set, which is a collection of data for strokes in the handwritten input made by the operator; a storage step for storing each extracted stroke data set; a retrieval information receiving step for receiving retrieval information inputted by the operator; a retrieval step for retrieving stroke data sets according to a degree to which respective contents of the stroke data sets match a content of the received retrieval information; and a display step for reading and displaying the retrieved stroke data sets. With this structure, even an information retrieval apparatus, which does not have a function for retrieving handwritten data with ambiguous retrieval information, can easily perform this handwritten data retrieval.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows the image displayed on the display unit of the embodiment before the handwritten data is inputted;

FIG. 7 shows a state where a user indicates a mark input in the embodiment;

DESCRIPTION OF THE PREFERRED EMBODIMENTS

Figure 1:
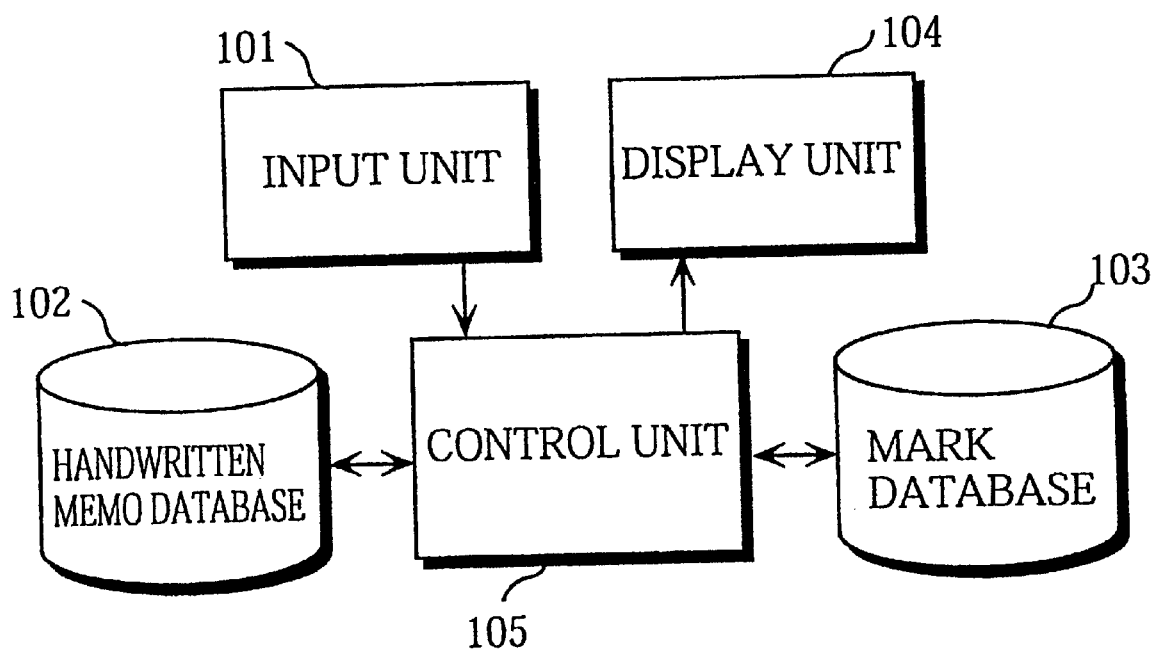
FIG. 1 shows the structure of the information retrieval apparatus of an embodiment of the present invention.
Figure 2:
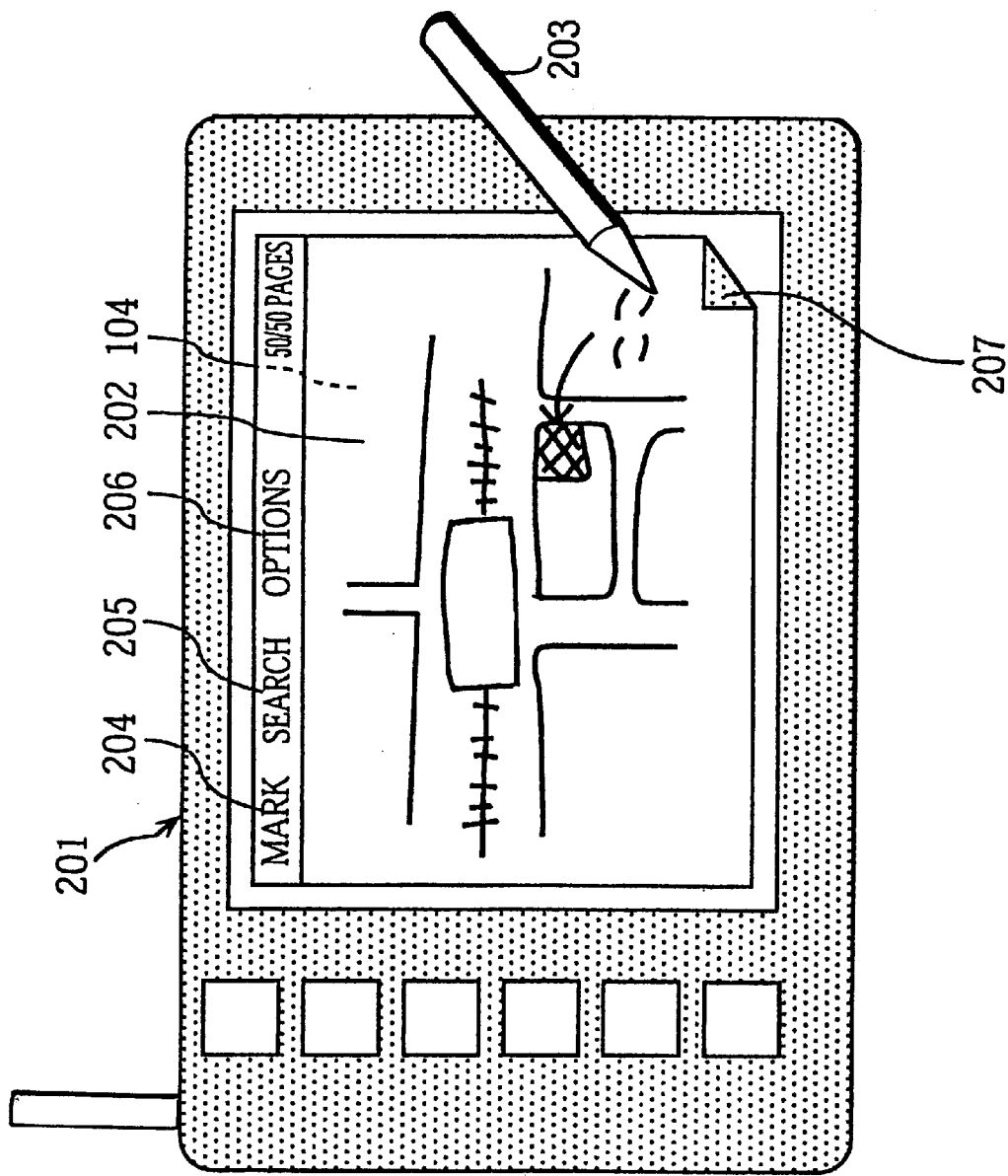
FIG. 2 shows the appearance of the information retrieval apparatus of the embodiment.

The following is a description of an embodiment of the information retrieval apparatus of the present invention.
Embodiment FIG. 1 shows the structure of the information retrieval apparatus of an embodiment of the present invention. The information retrieval apparatus includes the input unit 101, the handwritten memo database 102, the mark database 103, the display unit 104, and the control unit 105. FIG. 2 shows the appearance of the information retrieval apparatus 201.

The upper surface of the information retrieval apparatus 201 is provided with the display unit 104, such as a liquid crystal display, and the transparent tablet 202 which is used as the input unit 101 and is positioned over the display unit 104.

The input unit 101 includes the tablet 202 and the pen 203. While a user inputs handwritten data by touching the tablet 202 with the pen 203, the input unit 101 obtains coordinate values of the position where the pen 203 is pressing the tablet 202 at a predetermined interval, and outputs the coordinate values as coordinate data to the control unit 105.

When the user indicates "MARK" 204, "SEARCH" 205, "OPTIONS" 206, or the next page figure 207 displayed on the display unit 104, the input unit 101 outputs an indication signal to the control unit 105.

Note that although the tablet 202 and the pen 203 are used as the input unit 101 in the present embodiment, other devices may be used as far as they detect position coordinates of handwriting at a predetermined interval.

Figure 3:
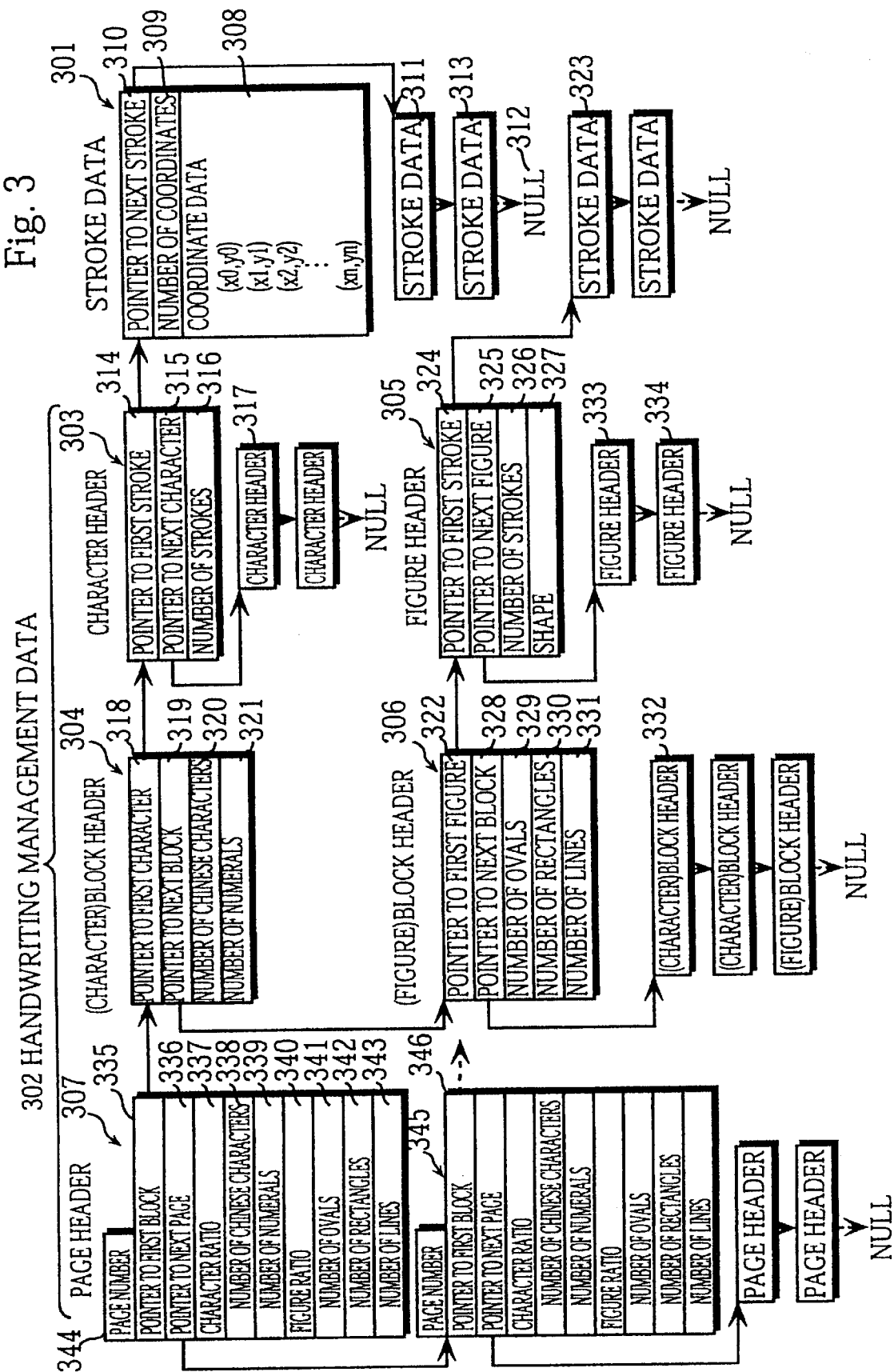
FIG. 3 shows an example of the structure of stroke data and handwriting management data of handwritten data stored in the handwritten memo database of the embodiment.

The handwritten memo database 102, achieved by a storage medium such a non-volatile memory or a hard disc, stores the stroke data 301, 311, 313, 323, . . . and the handwriting management data 302 as shown in FIG. 3. The handwriting management data 302 is composed of the character headers 303, 317, . . . , the character block headers 304, 332, . . . , the figure headers 305, 333, 334, . . . , the figure block headers 306, . . . , and the page headers 307, 345, . . .

The stroke data 301 includes the coordinate data 308, the number of coordinates 309, and the pointer to next stroke 310. The coordinate data 308 of the stroke data 301 is written by the control unit 105 when handwriting input mode is selected and handwritten data is inputted. The stroke data 301 represents data of one stroke between the position where the pen 203 starts to contact the tablet 202 and the position where the pen 203 leaves the tablet 202. More specifically, while the pen is pressing the tablet 202, each piece of the coordinate data 308 in the stroke data 301 is written sequentially by the control unit 105. When the pen 203 leaves the tablet 202, the control unit 105 writes the number of pieces of written coordinate data in the number of coordinates 309. When the first piece of coordinate data of the next stroke is inputted from the input unit 101, the control unit 102 writes the pointer to the next stroke 310, which is an address of the next stroke data 311 in which the first piece of coordinate data is written. When handwriting input mode is terminated, the pointer to next stroke of the last stroke data is set to "NULL."

The character header 303 shows the first classification information of data, such as stroke data 301, that has been identified as composing a single character, out of data classified by the control unit 105 as composing a character. The character header 303 is composed of the pointer to first stroke 314, the pointer to next character 315, and the number of strokes 316. The pointer to first stroke 314 gives an address of an area storing the pointer to next stroke 310 in the stroke data 301. The pointer to next character 315 gives an address of an area storing character header 317 of the character following the present character. The number of strokes 316 gives the number of pieces of stroke data, such as the stroke data 301, composing the character of the character header 303.

The character block header 304 gives the second classification information which is obtained from the first classification information such as the character header 303 and corresponds to a group of successive characters, such as a character string on a line. The character block header 304 is composed of the pointer to first character 318, the pointer to next block 319, the number of Chinese characters 320, and the number of numerals 321.

The pointer to first character 318 gives an address of an area storing the pointer to first stroke 314 in the character header 303 which corresponds to the first character of a character string classified into this character block header 304.

The pointer to next block 319 gives an address of an area storing the pointer to first figure 322 in the figure block header 306 following the character block header 304.

The number of Chinese characters 320 gives the number of characters classified as Chinese characters in the character string included in this character block header 304. In the same way, the number of numerals 321 gives the number of characters classified as numerals in the character string. Note that the classification as Chinese characters and numerals is performed according to the number of strokes in each character header 303, 317, . . .

The figure header 305 shows the first classification information of data, such as stroke data 323, that has been identified as composing a single figure, out of data classified by the control unit 105 as composing a figure. The figure header 305 is composed of the pointer to first stroke 324, the pointer to next figure 325, the number of strokes 326, and the shape 327. The pointer to first stroke 324, the pointer to next figure 325, and the number of strokes 326 are the same as those of the character header 303. The shape 327 gives a shape of the figure including stroke data 323, which can be one of an oval, a rectangle, and a line.

The figure block header 306 gives the second classification information, in which figure headers are connected to each other so that a plurality of figures can be dealt collectively. The figure block header 306 is composed of the pointer to first figure 322, the pointer to next block 328, the number of ovals 329, the number of rectangles 330, and the number of lines 331.

The pointer to first figure 322 gives an address of an area storing the pointer to first stroke 324 in the figure header 305 included in this block. The pointer to next block 328 gives an address of an area storing the pointer to first character in the character block header 332.

The number of ovals 329 gives the number of figure headers whose shapes are classified as ovals out of the present block. Similarly, the number of rectangles 330 gives the number of figures classified as rectangles and the number of lines 331 gives the number of figures classified as lines.

Note that in the figure block header 306, figure headers 305, 333, and 334 are connected to each other so that the three figures with these figure headers are collectively dealt with.

The page header 307 gives comprehensive classification information of the stroke data 301 etc. that is included in one page (one input screen). The page header 307 is composed of the pointer to first block 335, the pointer to next page 336, the character ratio 337, the number of Chinese characters 338, the number of numerals 339, the figure ratio 340, the number of ovals 341, the number of rectangles 342, and the number of lines 343. The page header also includes page number 344 for identifying the page.

The pointer to first block 335 gives an address of an area storing the pointer to first character 318 of the block header 304 which is the first block in a page. The pointer to next page 336 gives an address of an area storing the pointer to first block 346 in the page header 345 of the page following this page.

The character ratio 337 is the ratio of the number of pieces of stroke data classified as composing characters to the total number of pieces of stroke data included in the page, where the ratio is expressed as percentage. Similarly, the figure ratio 340 is the ratio of the number of pieces of stroke data classified as composing figures to the total number of pieces of stroke data included in the page, where the ratio is also expressed as percentage.

The number of Chinese characters 338 and the number of numerals 339 respectively give the number of Chinese characters and the number of numerals included in the page.

Similarly, the number of ovals 341, the number of rectangles 342, and the number of lines 343 respectively give the number of ovals, the number of rectangles, and the number of lines included in the page.

Figure 4A:
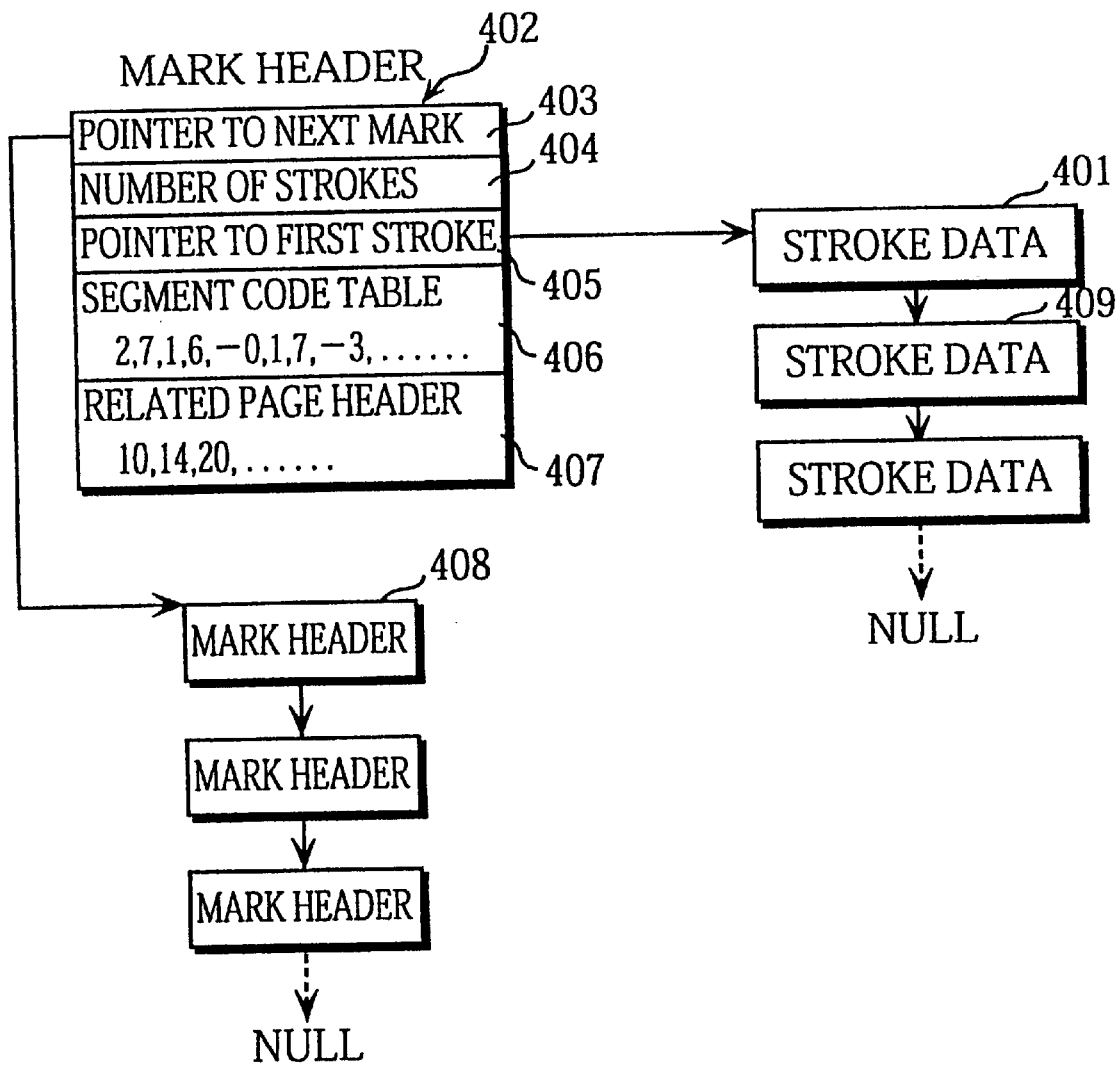
FIG. 4A shows an example of the structure of the handwritten mark data stored in the mark database of the embodiment.

The mark database 103, achieved by a storing medium such as a RAM or a magnetic disk, stores stroke data and mark headers for managing marks, as shown in FIG. 4A.

When the user selects free mark input mode and inputs handwritten data as a retrieval mark using the input unit 101, the stroke data 401, 409, . . . are written by the control unit 105 in the same manner as the case of the handwritten memo database 102. The contents of the stroke data 401, 409, . . . are similar to those of the stroke data 301.

The mark header 402 is composed of the pointer to next mark 403, the number of strokes 404, the pointer to first stroke 405, the segment code table 406, and the related page header 407.

The pointer to next mark 403 gives an address of an area storing the mark header 408 of the next retrieval mark.

The number of strokes 404 gives the number of pieces of stroke data, such as the stroke data 401, composing the mark of the mark header 402.

Figure 4B:
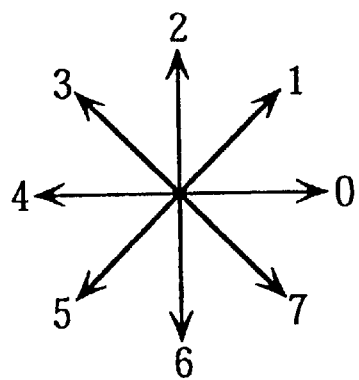
FIG. 4B shows the segment code of the embodiment.

The pointer to first stroke 405 gives an address of an area storing the stroke data 401 which is the first stroke data of the mark. The segment code table 406 indicates characteristics of the mark using segment codes. As shown in FIG. 4B, the segment codes represent eight directions from a center using integer values "0–7". Each segment code gives a direction from the starting point of a line which is given by linear interpolation of the coordinate data of each stroke data 401, 409 . . . The direction from the last coordinate data of the stroke data 401 to the first coordinate data of stroke data 409 is expressed using one of the segment codes with a sign "-" to indicate that there is no handwriting between the two pieces of coordinate data.

The related page header 407 gives page numbers for identifying pages related to the mark of the mark header 402.

Figures 5A, 5B:
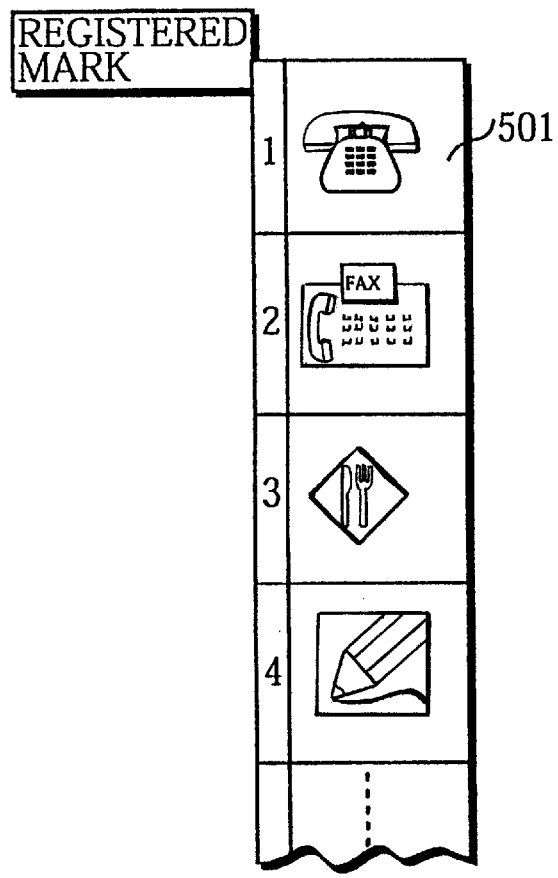
FIG. 5A shows a list of registered marks in the embodiment.
FIG. 5B shows the mark relation table stored in the mark database of the embodiment.

The mark database 103 also stores a list of registered marks with their identification numbers as shown in FIG. 5A. The registered marks, such as the registered mark 501, substitute retrieval marks inputted by the user under the free mark input mode described above.

The mark database 103 stores the mark relation table 504 shown in FIG. 5B which includes the mark identification numbers 502 and the related page headers 503, where each related page header 503 records page numbers of pages including the mark of one mark identification number 502.

The display unit 104, achieved by a liquid crystal display or other display device, displays data such as inputted handwritten data according to instructions from the control unit 105.

The control unit 105, achieved by components such as a CPU and a memory, writes coordinate data inputted from the input unit 101 in the stroke data of the handwritten memo database 102 or of the mark database 103 according to instruction signals, and generates the handwriting management data 302 or the mark management data from the coordinate data written in the stroke data.

When the user inputs a selection signal for handwriting mode using the input unit 101, the control unit 105 adds one to the page number of the previous page header to obtain the page number 344 and writes the page number 344 in the page header 307 of the handwriting management data 302, which is shown in FIG. 3 and is stored in the handwritten memo database 102. Note that in this state, the handwritten memo database 102 stores only the page header 307 and the handwriting management data and stroke data of previous page headers which have already been written.

After the page number 344 of the page header 307 has been written, the input screen 601 shown in FIG. 6 is displayed on the display unit 104. In this figure, the indication "50/50 PAGES" is displayed on the right end of the top field 602. This indication "50/50 PAGES" means that 50 pages have been inputted in the handwritten memo database 102 and the user is inputting data in the 50th page from the input screen 601.

The user inputs handwritten data by making the pen 203 contact the input screen 601.

When coordinate data is inputted from the input unit 101, stroke data shown in FIG. 3 is written in the handwritten memo database 102, with line segments between sets of coordinate data being interpolated using straight lines to display handwriting on the input screen 601. After the coordinate data 308 of one stroke has been written, the control unit 105 counts the number of pieces of coordinate data 308 and writes the count result in the number of coordinates 309. On receiving coordinate data of the next stroke, the control unit 105 writes an address in the pointer to next stroke 310 and writes the next stroke data 311.

FIG. 2 shows an example of the input screen 601 when handwritten data of one page (of one input screen) has been inputted in this manner.

When the user indicates "MARK" 204 shown in FIG. 2, an indication signal for displaying a mark menu is inputted in the control unit 105 from the input unit 101.

The control unit 105 reads the mark menu stored in its memory and has the display unit 104 display window 701 of the mark menu shown in FIG. 7. The mark menu is composed of four menu items, namely "REGISTERED MARK" 702, "FREE MARK" 703, "DISPLAY MARK" 704, and "HIDE MARK" 705. When the user indicates "REGISTERED MARK" 702 using the pen 203 in this state, the control unit 105 receives an indication signal of "REGISTERED MARK" 702 from the input unit 101 and has the display unit 104 display a list of registered marks (see FIG. 5A). When the user indicates one out of the list using the pen 203, the page number of the page being displayed is written in the related page header 503 of the indicated registered mark in the mark relation table 504.

Note that this list of the registered marks is stored in the mark database 103 beforehand. The registered marks in this list and free marks represent designs and cannot be replaced by character codes, unlike file names.

Figure 8:
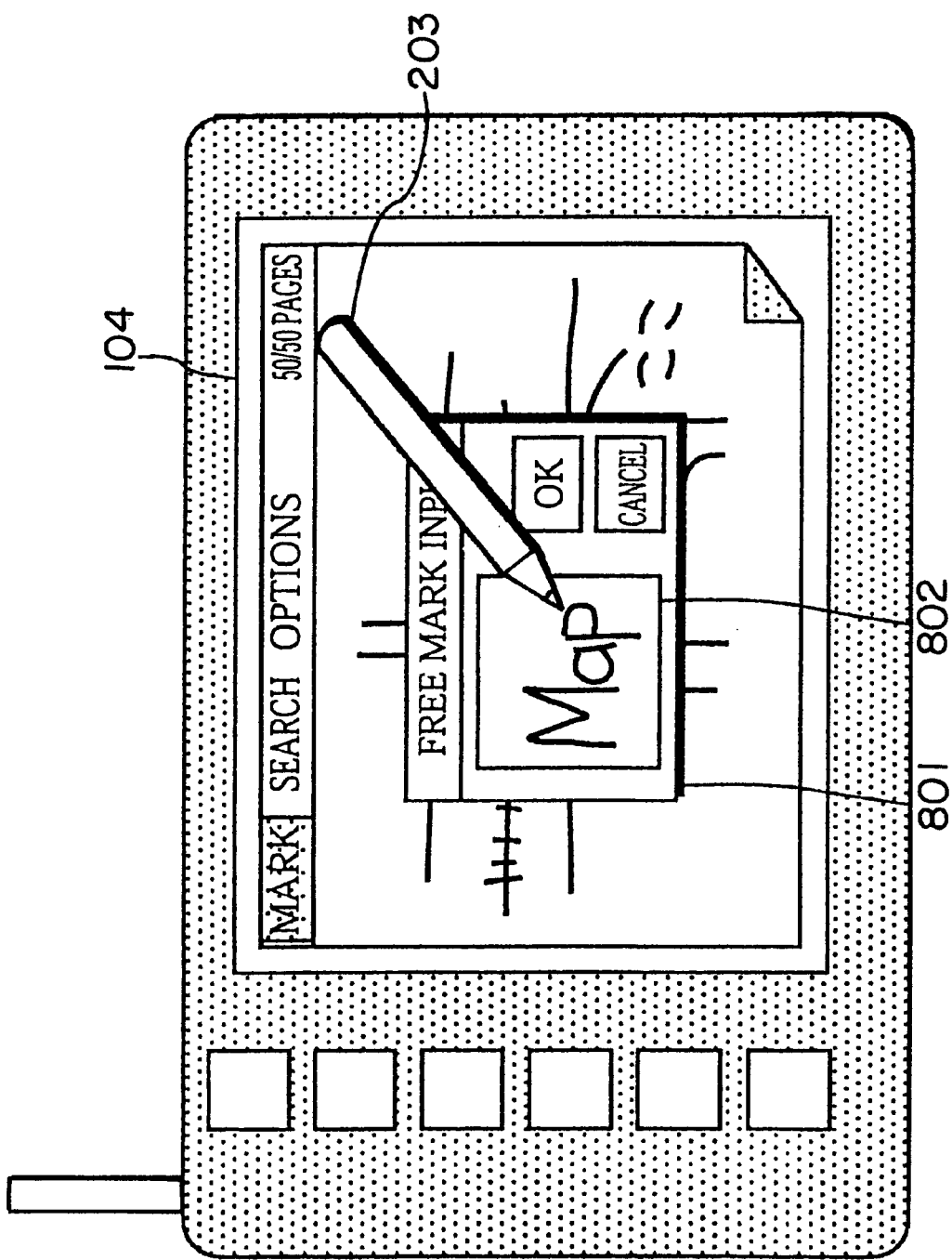
FIG. 8 shows a state where the user inputs a mark in the embodiment.

When the user indicates "FREE MARK" 703 using the pen 203, the control unit 105 receives an indication signal of "FREE MARK" 703 from the input unit 101. The control unit 105 closes the window 701, reads the window 801 that allows the user to input a free mark shown in FIG. 8 from its memory, and has the display unit 104 display the window 801.

The mark 802, which is handwriting written with the pen 203 on the input unit 101, is inputted in the control unit 105 in a form of coordinate data.

The control unit 105 writes the coordinate data in the mark database 103 in the form of stroke data, such as the stroke data 401 (see FIG. 4A).

When the user indicates "OK" button 803, the input unit 101 outputs a signal to the control unit 105 indicating that the retrieval mark has been inputted.

The control unit 105 generates the mark header 402, which is the mark management data, from the stroke data stored in the mark database 103. The control unit 105 counts the number of pieces of stroke data connected to each other and writes the count result in the number of strokes 404. The control unit 105 writes an address of an area storing the first stroke data 401 in the pointer to first stroke 405. The control unit 105 reads coordinate data sequentially starting from the first piece of coordinate data, replaces the direction between each pair of coordinate data in each stroke with a segment code, and writes the segment codes in the segment code table 406. Note that when the same segment code is successively obtained for each pair in this process, only the first value of the same segment code is written in the segment code table 406. By doing so, characteristics of the free mark are extracted. Then the control unit 105 writes a page number of the page being displayed in the related page header 407.

On receiving an indication signal of free mark input mode, the control unit 105 writes an address of an area storing the next mark header 408 in the pointer to next mark 403.

The control unit 105 has the display unit 104 display the mark menu shown in FIG. 7 again and receives an indication of "DISPLAY MARK" 704 or "HIDE MARK" 705 is selected by the user from the input unit 101. When "HIDE MARK" 705 is selected, the mark is not displayed in the input screen. When an indication signal of "DISPLAY MARK" 704 is inputted from the input unit 101, the control unit 105 closes the window 701 and has the display unit 104 return to the display state shown in FIG. 2.

Figure 9:
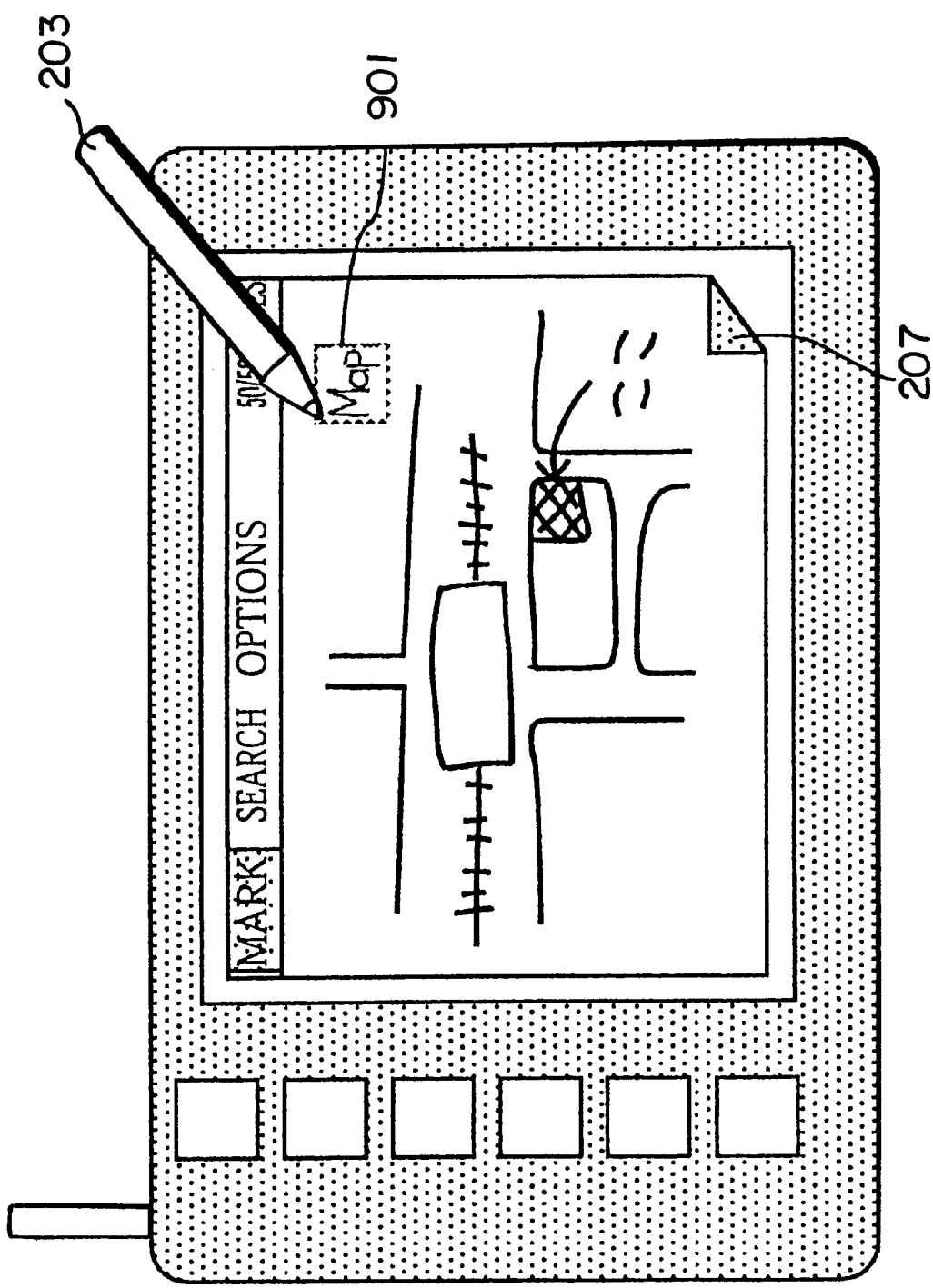
FIG. 9 shows a state where the user pastes a mark onto handwritten memo data in the embodiment.

When the user uses the pen 203 to indicate the display position of the mark 901 on the input unit 101 as shown in FIG. 9, the control unit 105 receives a notification concerning the position, reads stroke data 401, 409, . . . of the mark 802 stored in the mark database 103, and has the display unit 104 display the stroke data 401, 409, . . . at the indicated position at a predetermined size or a designated size.

The size of the mark 901 may be set at ¼ of its original size, for instance.

When the user indicates the next page figure 207 with the pen 203, the input unit 101 outputs an indication signal of the next page to the control unit 105.

On receiving this indication signal, the control unit 105 classifies stroke data such as the stroke data 301 (see FIG. 3) of each page stored in the handwritten memo database 103 into character strokes and figure strokes. This classification is performed with a method disclosed in Japanese Laid-Open Patent Application No. 60-136890.

As a result, the stroke data 301 etc. is classified into character headers and figure headers and is interrelated as shown in FIG. 3.

Using the character distinguishing methods disclosed in Japanese Laid-Open Patent Application Nos. 7-295733 and 8-50632, the control unit 105 classifies the character stroke data into each character and generates a character header (character header 303 etc.) for each character. Each character header includes the number of strokes (number of strokes 316 etc.), composing the character of the character header.

The control unit 105 integrates the character headers 303, 317, . . . into a character block using coordinate data of stroke data such as the stroke data 301 and generates a character block header. A character block includes, for instance, characters on one line or characters that form a character group.

The control unit 105 writes an address of an area storing the pointer to first stroke 314 of the character header 303 in the pointer to first character 318 of the character block header 304. The control unit 105 writes an address of an area storing the pointer to first character 318 of the character block header 304 in the pointer to first block 335 of the page header 307.

The figure header 305 of one figure is generated from stroke data, such as stroke data 323, that has been classified as composing a figure. Here, an address of an area storing the stroke data 323 is written in the pointer to first stroke 324 of the figure header 305. When the figure header 333 is generated, an address of an area storing the figure header 333 is written in the pointer to next figure 325. The number of strokes 326 gives the number of pieces of stroke data, such as the stroke data 323, composing the figure of the figure header 305.

The figure block header 306 connecting a set of figure headers 333, 334, . . . is generated and an address of an area storing the pointer to first stroke 324 of the figure header 305 is written in the pointer to first figure 322.

An address of an area storing the pointer to first figure 322 is written in the pointer to next block 319 of the character block header 304.

The hierarchical handwriting management data 302 which is composed of page headers, character block headers, figure block headers, character headers, and figure headers is gradually generated from stroke data such as the stroke data 301.

The control unit 105 calculates the total number of strokes S by summing up the numbers of strokes of the character headers 303, 317, . . . and of the figure headers 305, 333, 334, . . . , and calculates the number of character strokes SC, and the number of figure strokes SF. The ratio of the number of character strokes SC to the total number of strokes S is calculated as the character ratio. The ratio of the number of figure strokes SF to the total number of strokes S is calculated as the figure ratio. The calculated character ratio and figure ratio are respectively written in the character ratio 337 and the figure ratio 340 of the page header 307 as percentages.

Initial values "0" are respectively written in the number of Chinese characters 320 and the number of numerals 321 of the character block header 304 and in the number of Chinese characters 338 and the number of numerals 339 of the page header 307. Initial values "0" are also written in the number of ovals 329, the number of rectangles 330, and the number of lines 331 of the figure block header 306 and in the number of ovals 341, the number of rectangles 342, and the number of lines 343 of the page header 307, respectively.

The control unit 105 sets the value of the pointer to first block 335 in the variable "block" and extracts characteristics of contents of inputted handwritten data of each successive block header, such as the character block header 304, the figure block header 306, and the character block header 332.

The control unit 105 successively refers to the character block header 304, the figure block header 306, and the character block header 332 by assigning the values of the pointer to first block 335, of the pointer to next block 319, and of the pointer to next block 328 to the variable "block" to extract the characteristics of contents of inputted handwritten data. The control unit 105 judges whether each block header being referred to is a character block header or a figure block header. When the block header being referred to is judged to be a character block header, the control unit 105 refers successively the character headers 303, 317, . . . , by successively setting the values of the pointer to first stroke 314, of the pointer to next character 315, . . . of the character header 303 in the variable "charHeader" to read the number of strokes of each character header. If the read number of strokes of the character header exceeds "2", the control unit 105 judges that the character header concerns a Chinese character; if not, the control unit 105 judges that the character header concerns a numeral. After this, the control unit 105 increments the values of the numbers of Chinese characters 320 and 338 or the values of the numbers of numerals 321 and 339 of the character block header 304 and the page header 307 by one in accordance with the result of the above judgement. More specifically, the control unit 105 classifies handwritten data classified into characters into Chinese characters and numerals according to the number of strokes of each character.

When the block header being referred to is judged to be a figure block header, the control unit 105 successively refers to the figure headers 305, 333, 334, . . . , by assigning the values of the pointer to first stroke 324, of the pointer to next figure 325, . . . of the figure headers 305, 333, 334, . . . to the variable "figHeader" to refer to the stroke data 323, . . . of the figure headers. During this process, the control unit 105 classifies the figure of each figure header into one of three shapes, namely an oval, a rectangle, and a line, and writes the shape in the shape, such as the shape 327, of each figure header.

This figure classification is performed with the figure recognition technique disclosed in Japanese Laid-Open Patent Application No.60-136892.

The control unit 105 increments the values of the numbers of ovals 329 and 341, the numbers of rectangles 330 and 342, and the numbers of lines 331 and 343 of the figure block header 306 and the page header 307 by one in accordance with the result of the above classification.

When the variable "charHeader" or "figHeader" becomes blank, the address value of the next block header is assigned to the variable "block." When the variable "block" becomes blank, the handwriting management data 302 of one page has been generated.

The following description concerns the operation for having the information retrieval apparatus of this embodiment display inputted handwritten data.

Figure 10:
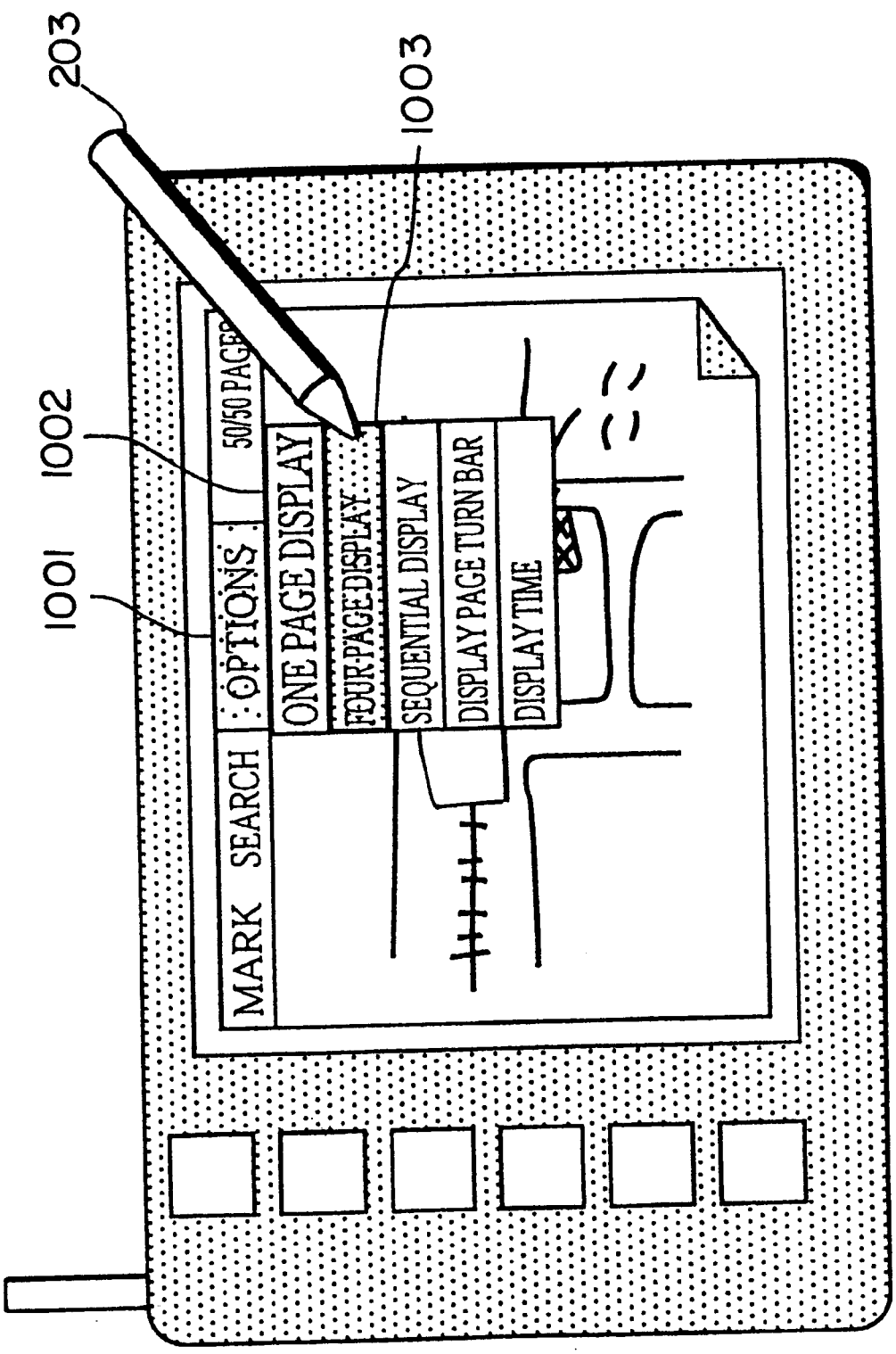
FIG. 10 shows a state where the user indicates the display of handwritten memo data in the embodiment.

The user has the information retrieval apparatus display the display menu 1002 by tapping the pen 203 on "OPTIONS" 1001. In this description, the user then indicates "FOUR PAGE DISPLAY" 1003 out of the menu items in the display menu 1002, as shown in FIG. 10.

Figure 11:
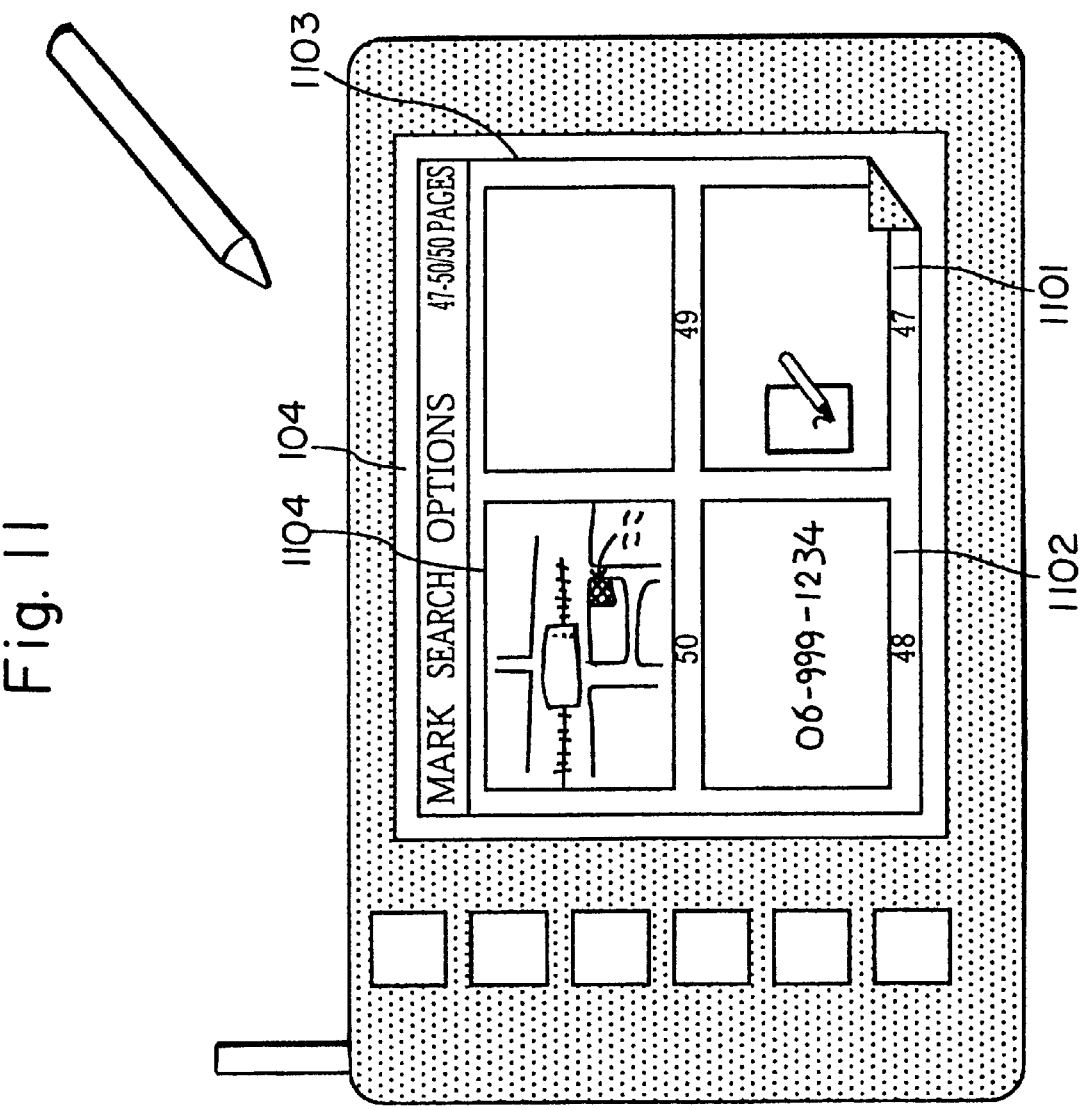
FIG. 11 shows an example of the list display of handwritten memo data in the embodiment.

On receiving an indication signal of "OPTIONS" 1001 from the input unit 101, the control unit 105 reads the display menu 1002 from its memory and has the display unit 104 display a window of the display menu 1002. On receiving an indication signal of "FOUR PAGE DISPLAY" 1003 from the input unit 101, the control unit 105 reads handwritten data for the most recently inputted four pages from the handwritten memo database 102, reduces the pages at a predetermined ratio, and has the display unit 104 display the reduced pages with their page numbers, as shown in FIG. 11. Display images 1101, 1102, 1103, and 1104 of the reduced pages show handwritten data of pages of page numbers 47–50, as indicated by the "47–50/50" display at the right end of the top field of the display unit 104. By designating the next page figure 1105, the user can see the handwritten data of pages that were inputted before the currently displayed pages.

Figure 12:
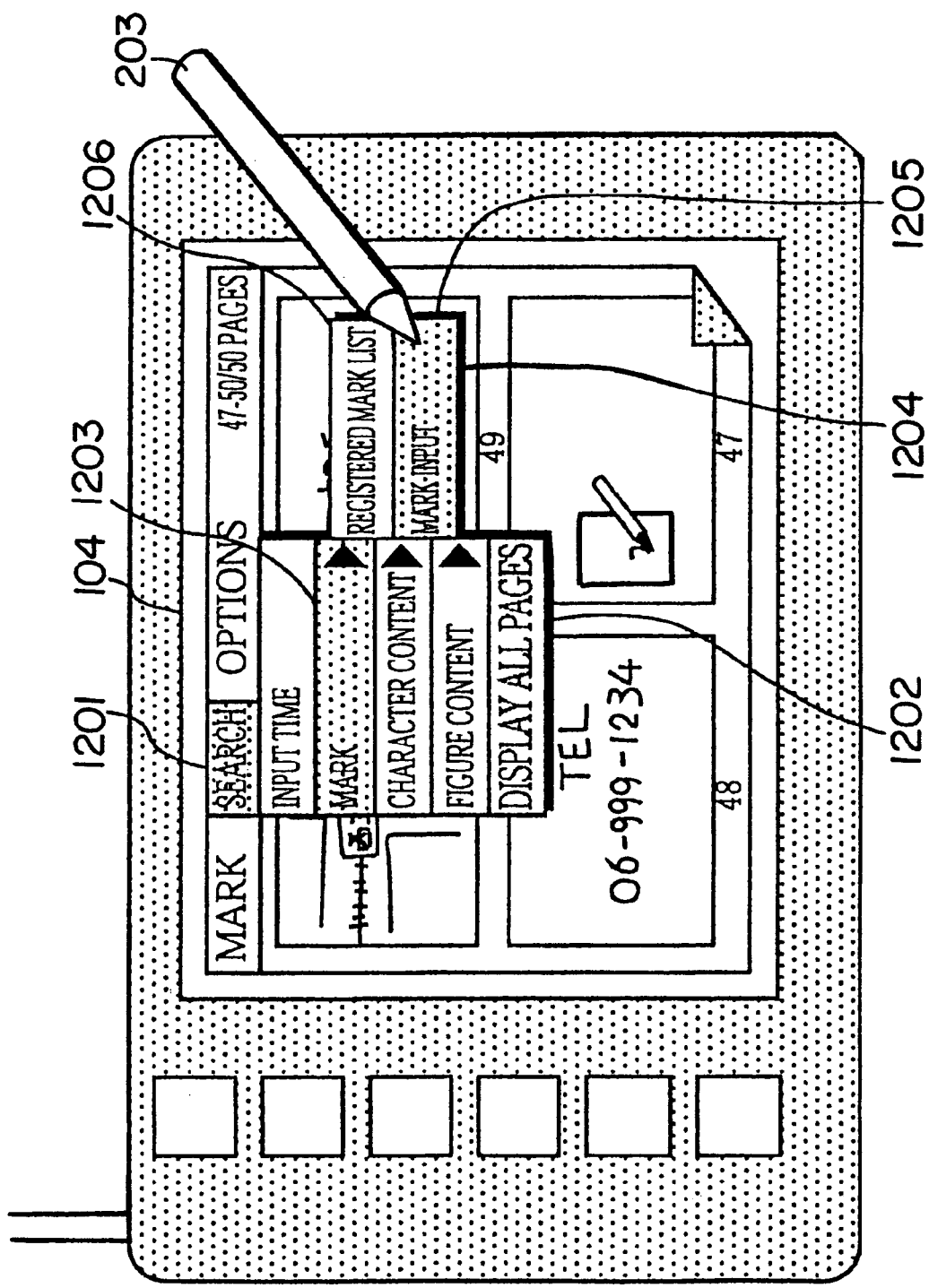
FIG. 12 shows a state where the user indicates mark retrieval in the embodiment.

FIG. 12 shows a state where the user indicates "SEARCH" 1201 to see the retrieval menu 1202, indicates "MARK" 1203 of the displayed retrieval menu 1202 to see the auxiliary menu 1204, and indicates "MARK INPUT" 1205 with the pen 203.

Figure 13:
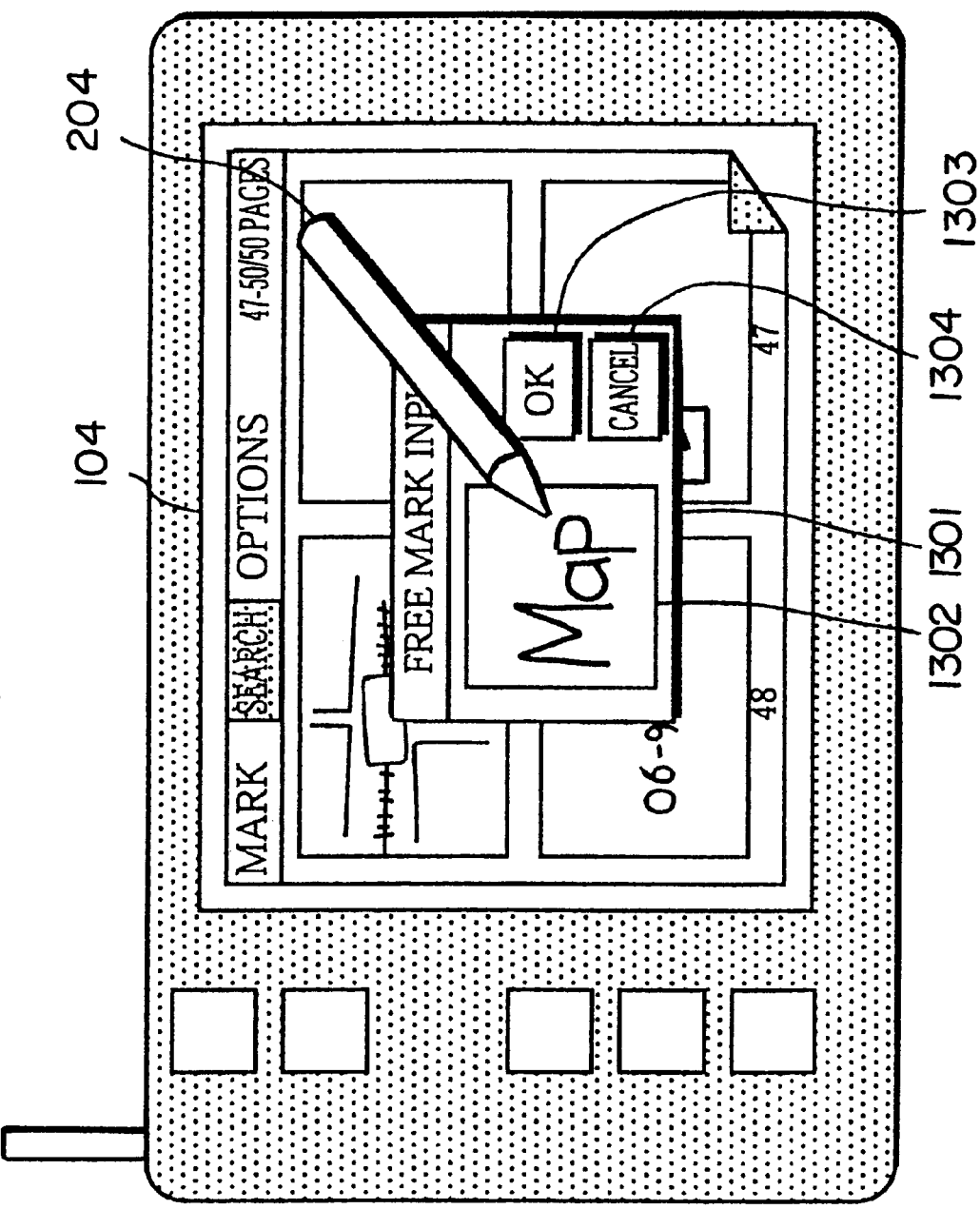
FIG. 13 shows a state where the user inputs a retrieval mark in the embodiment.

On receiving an indication signals of "SEARCH" 1201, of "MARK" 1203, and of "MARK INPUT" 1205 sequentially, the control unit 105 has the display unit 104 display the retrieval menu 1202, the auxiliary menu 1204, and then display the free mark input window 1301 at the center of the display unit 104, as shown in FIG. 13.

The user inputs handwritten data for the retrieval mark 1302 with the pen 203 and indicates "OK" 1303.

On receiving the input of coordinate data from the input unit 101, the control unit 105 writes the coordinate data in the mark database 103 as stroke data as shown in FIG. 4A. On further receiving the input of an indication signal of "OK" 1303, the control unit 105 generates a mark header. During the retrieval process, the generated mark header is not connected to other mark headers, unlike the mark header 402 shown in FIG. 4A. Therefore, the generated mark header does not include a pointer to next mark and a related page header. The degree of similarity between values in the segment code table of the generated mark header and those of each mark header stored in the mark database 103 beforehand, such as the mark header 402, is calculated with a DP (Dynamic Programming) matching method.

Note that the DP matching method is a known technique and is disclosed in "R. Bellman:*Dynamic Programming*, Princeton Univ.," for instance.

The control unit 105 extracts mark headers, whose calculated degrees of similarity are each equal to or greater than a predetermined value, and reads page numbers recorded in the related page header of each extracted mark header. This predetermined value is changeable. When this predetermined value is changed to a greater value, the number of extracted mark headers can be reduced and therefore the total number of page numbers recorded in related page headers of the extracted mark headers can be reduced. Also, it is possible for mark headers to be extracted one by one in descending order of the value of similarity and for the number of page numbers recorded in the related page header of each extracted mark header to be added up until total of page numbers reaches a predetermined number of page numbers.

The control unit 105 retrieves page headers with the read page numbers from the handwritten memo database and reads the stroke data of the retrieved page headers. The control unit 105 has the display unit 104 display handwritten data of pages with the read page numbers using the read stroke data at a predetermined size, as shown in FIG. 14.

Figure 14:
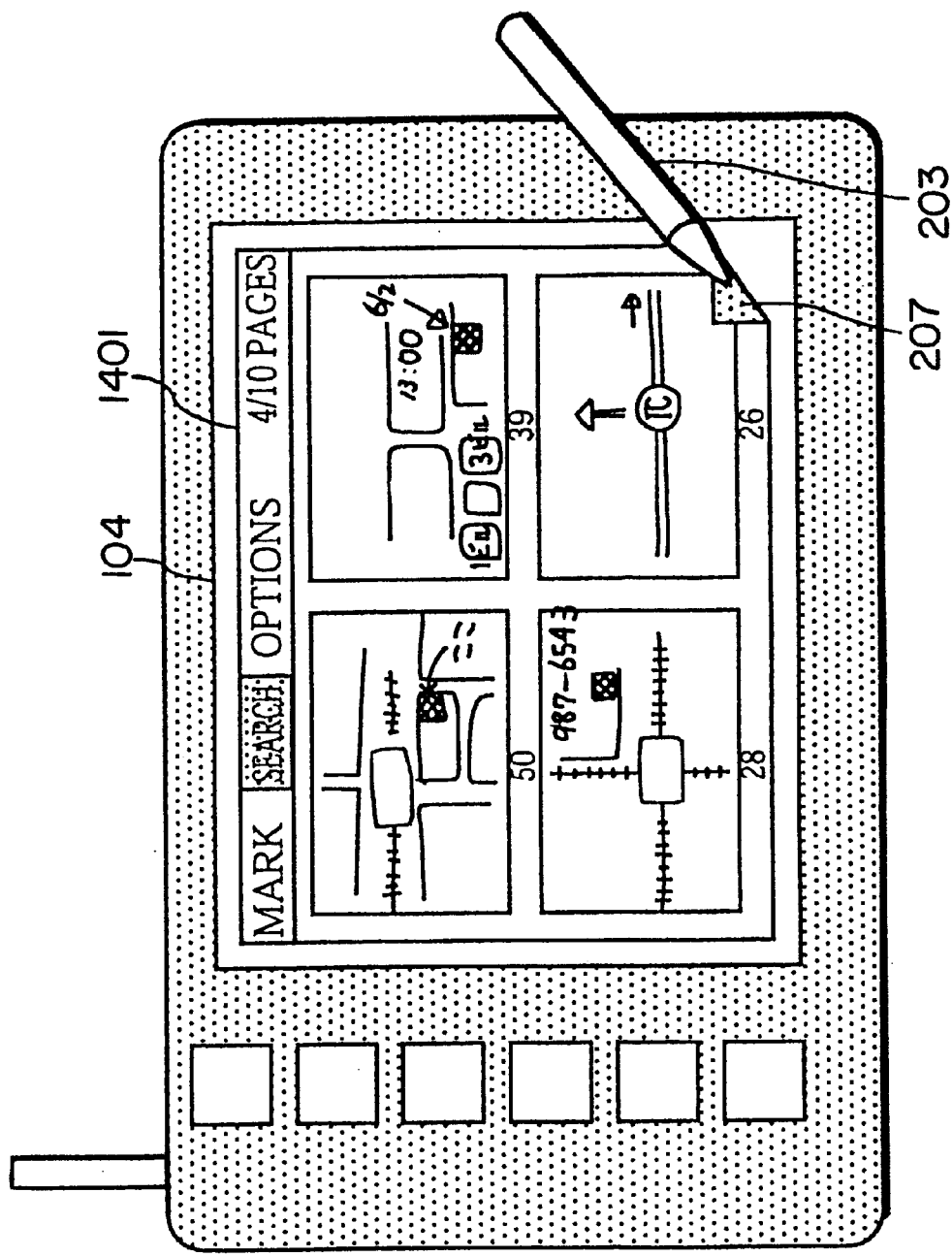
FIG. 14 shows a result of the mark retrieval in the embodiment.

FIG. 14 shows a state where handwritten data of four pages is displayed on the display unit 104. The indication "4/10 PAGES" indicates that 10 pages have been retrieved for the retrieval mark 1302 and that 4 pages out of the 10 pages are being displayed.

When the user indicates the next page figure 207 with the pen 203, the control unit 105 has the display unit 104 display handwritten data of remaining six pages successively.

When the user indicates "CANCEL" 1304, handwritten data of the retrieval mark 1302 is deleted by the control unit 105. That is, on receiving an indication signal of "CANCEL" 1304 from the input unit 101, the control unit 105 deletes the stroke data written in the mark database 103.

In this description, the user inputs handwritten data as the retrieval mark 1302. However, the user may indicate the registered mark list 1206 to see the list of registered marks shown in FIG. 5A and indicate one out of the list to retrieve desired handwriting.

In this case, the control unit 105 reads page numbers of the related page header 503 corresponding to the indicated registered mark by referring to the mark relation table 504 stored in the mark database 103, reads the stroke data related to each read page number stored in the handwritten memo database 102, and has the display unit 104 display the read stroke data.

Figure 15:
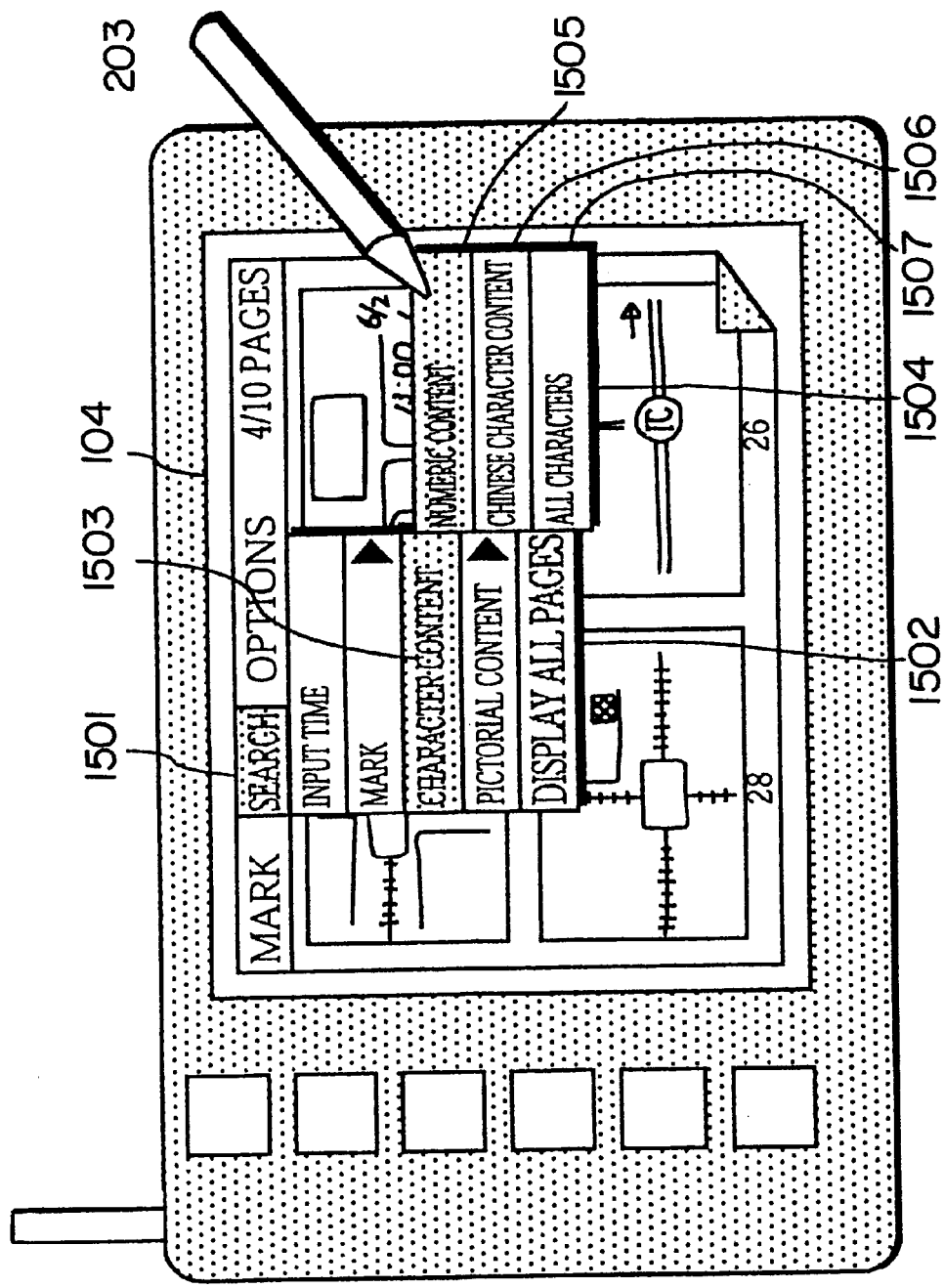
FIG. 15 shows a state where the user indicates retrieval of a numeric content in the embodiment.

As shown in FIG. 15, when the user indicates "SEARCH" 1501 in the top field with the pen 203, the input unit 101 outputs an indication signal of "SEARCH" 1501 to the control unit 105. The control unit 105 has the display unit 104 display the retrieval menu 1502. When the user indicates "CHARACTER CONTENT" 1503 with the pen 203, the input unit 101 outputs an indication signal of the display of the auxiliary menu 1504 of "CHARACTER CONTENT" to the control unit 105. The control unit 105 has the display unit 104 display the auxiliary menu 1504 of "CHARACTER CONTENT" which is composed of three menu items, namely "NUMERIC CONTENT" 1505, "CHINESE CHARACTER CONTENT" 1506, and "ALL CHARACTERS" 1507. "NUMERIC CONTENT" 1505 is indicated to retrieve pages whose handwritten contents include a large number of numeric contents; "CHINESE CHARACTER CONTENT" 1506 is indicated to retrieve pages which include a large number of Chinese character contents; and "ALL CHARACTERS" 1507 is indicated to retrieve pages which include a large number of character contents.

When the user indicates "NUMERIC CONTENT" with the pen 203, the input unit 101 outputs an indication signal of "NUMERIC CONTENT" to the control unit 105.

Figure 16:
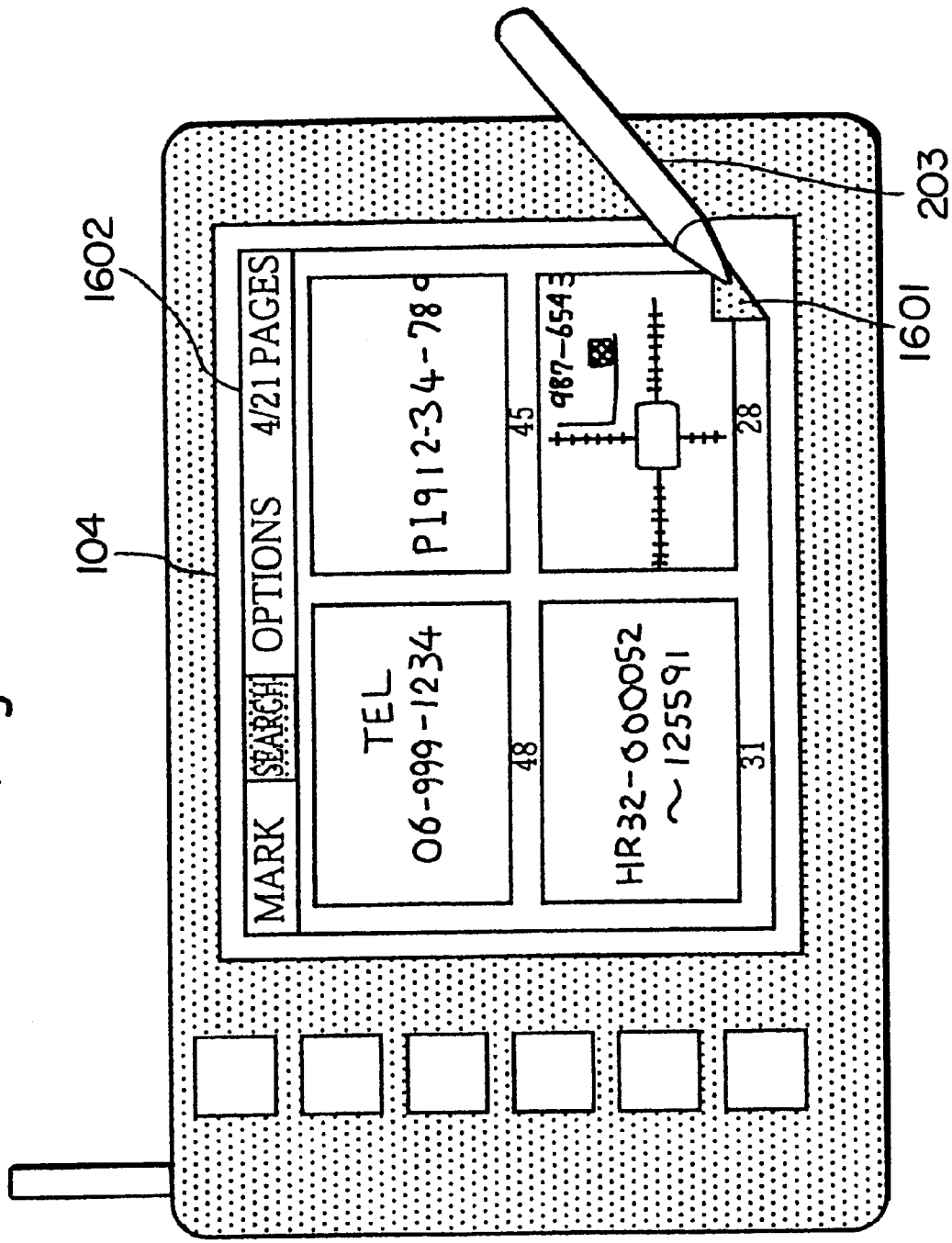
FIG. 16 shows a result of the retrieval of numeric contents in the embodiment.
Figure 17:
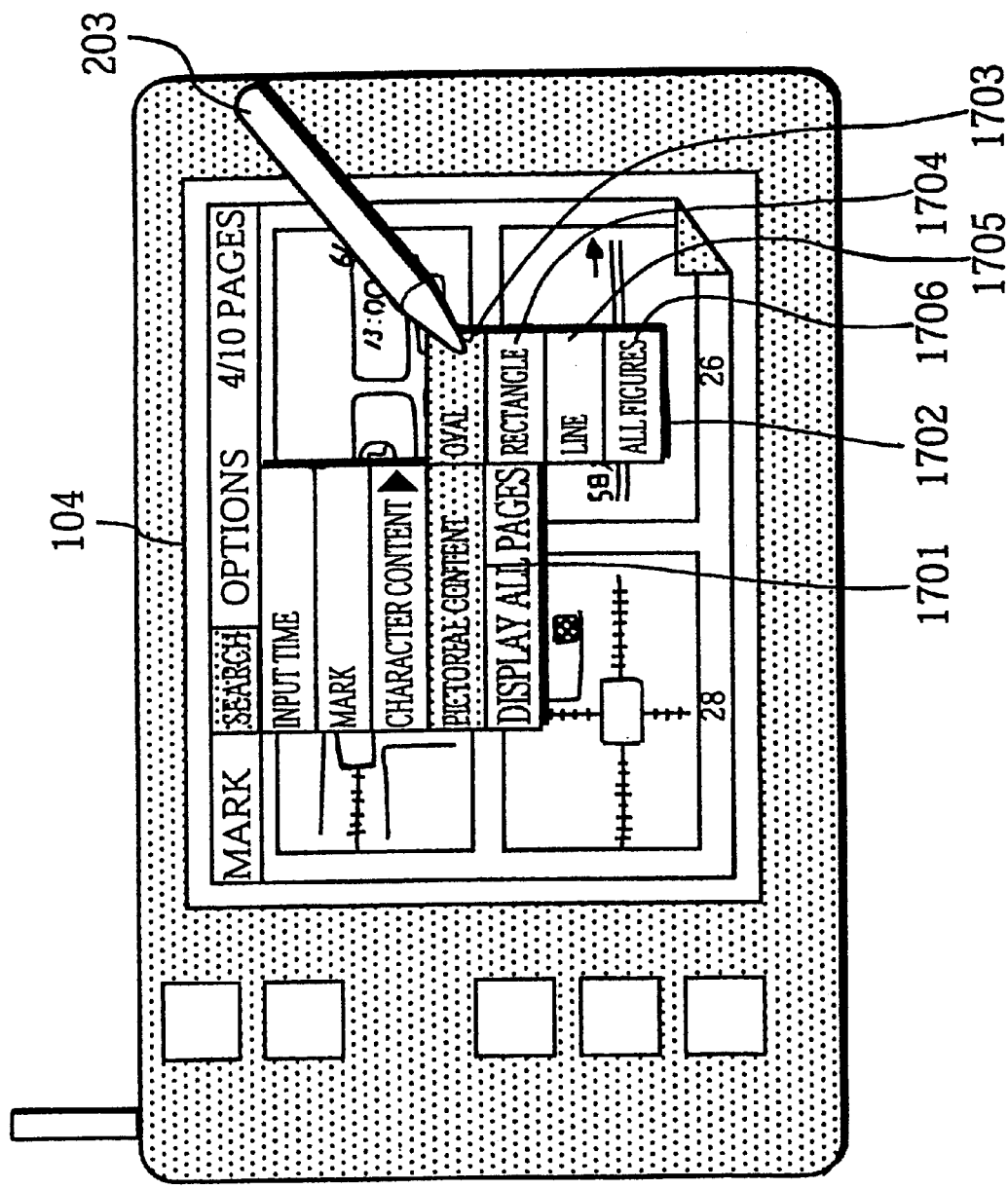
FIG. 17 shows a state where the user indicates retrieval of a pictorial content in the embodiment.
Figure 18:
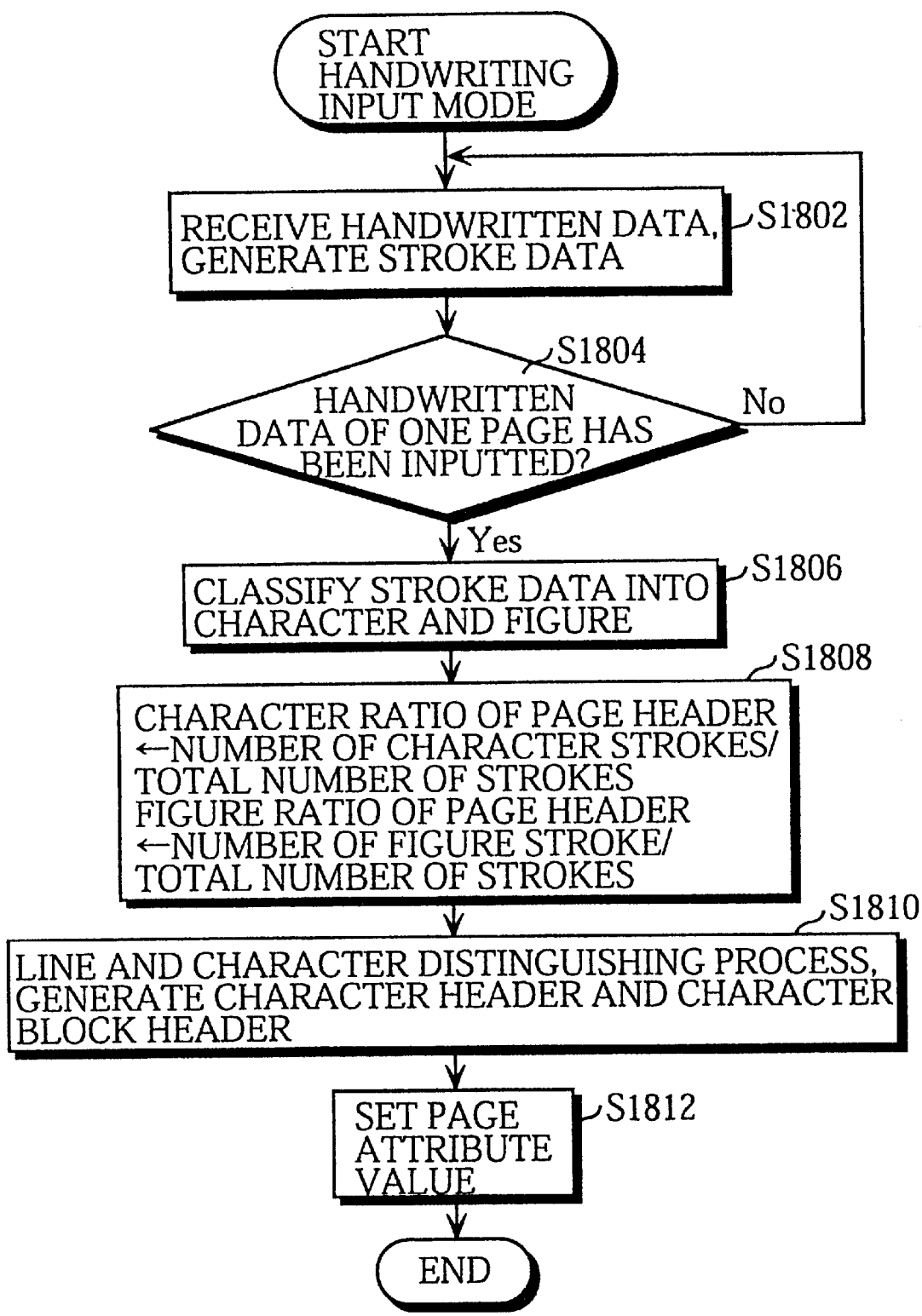
FIG. 18 is a flowchart of the operation of the control unit when handwritten data is inputted in the embodiment.
Figure 19:
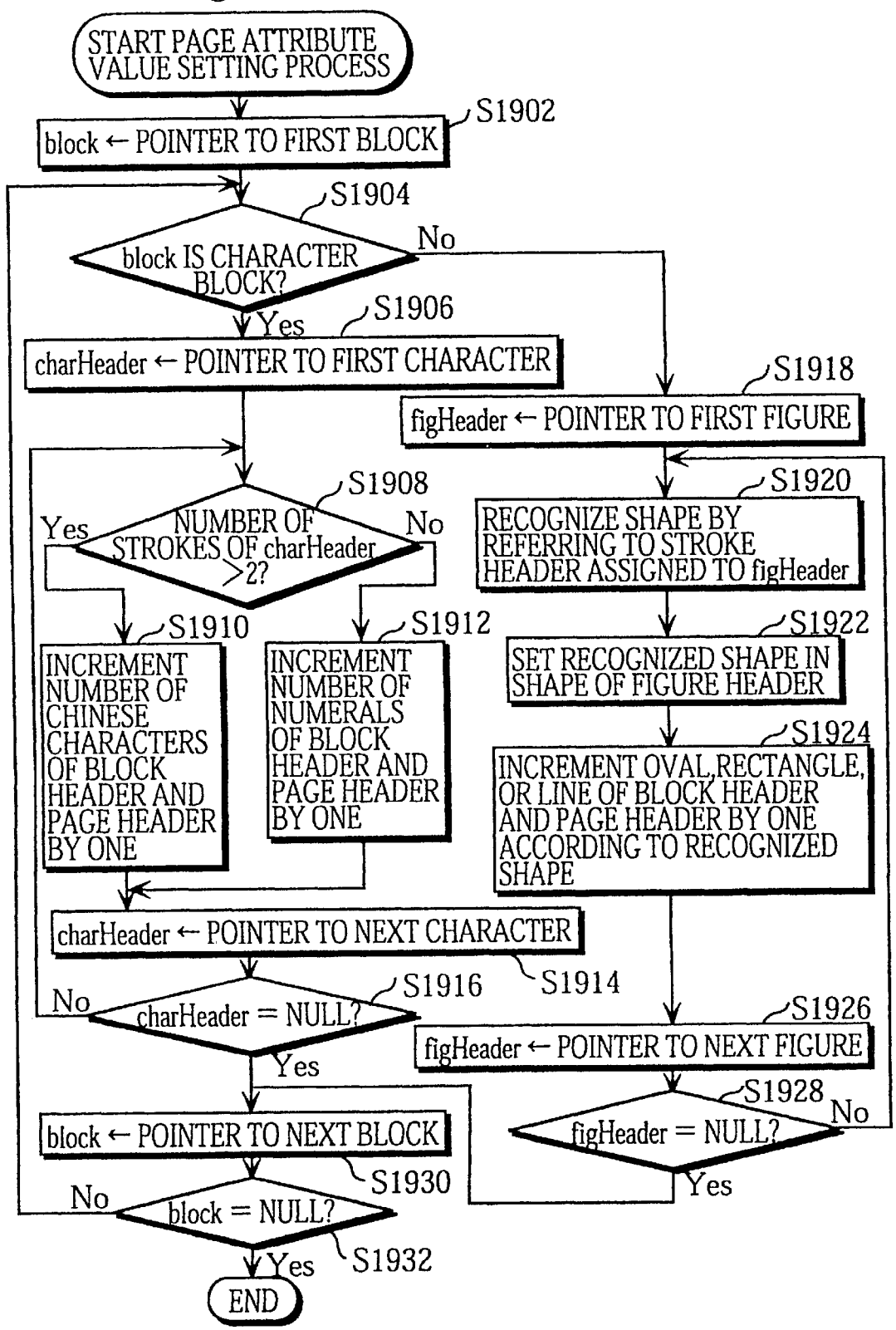
FIG. 19 is a flowchart of the operation for setting each kind of information in the handwritten management data structure of the handwritten data stored in the handwritten memo database in the embodiment.
Figure 20:
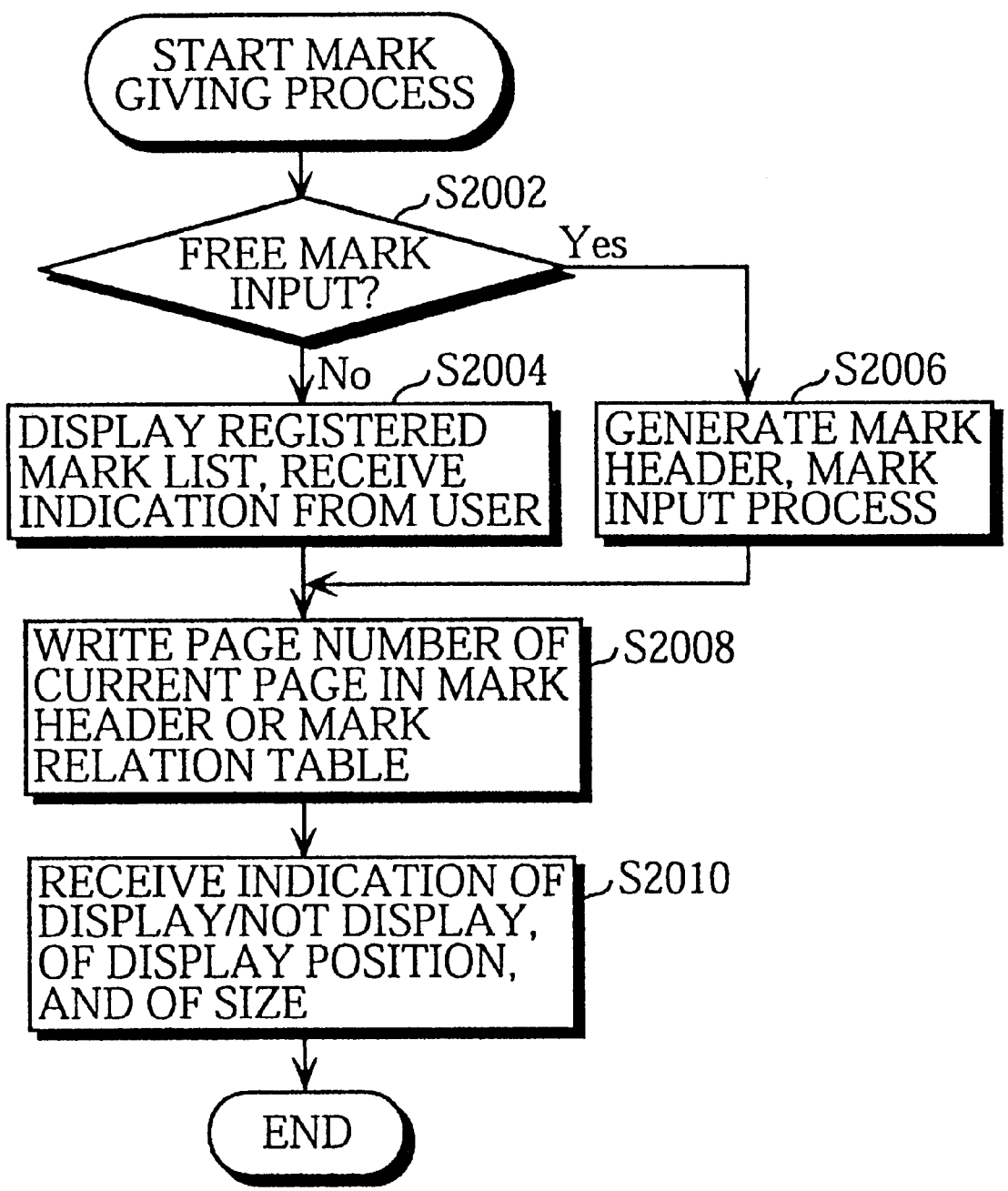
FIG. 20 is a flowchart of the operation of the control unit when a mark is inputted in the embodiment.
Figure 21:
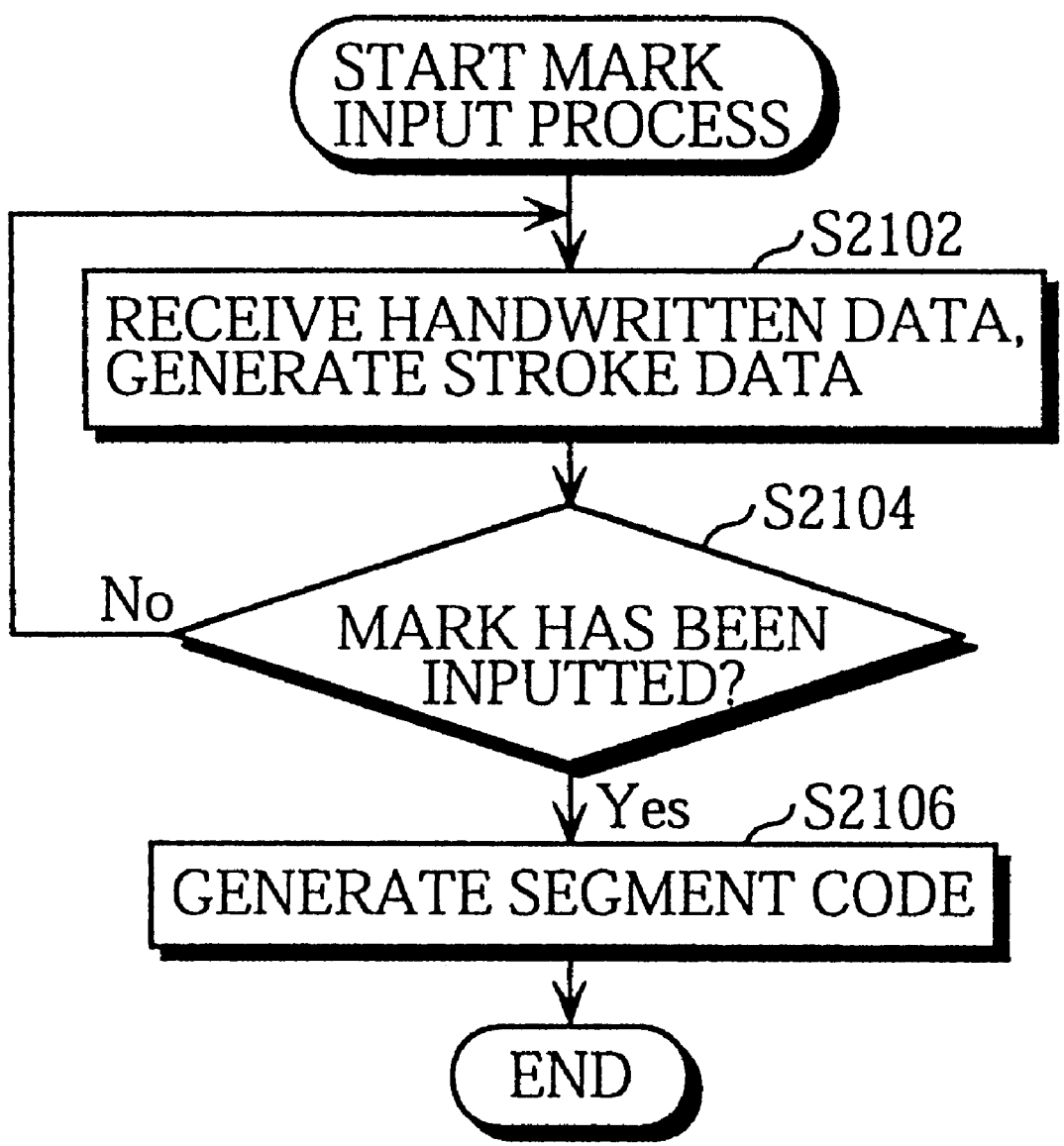
FIG. 21 is also a flowchart of the operation of the control unit when a mark is inputted in the embodiment.
Figure 22:
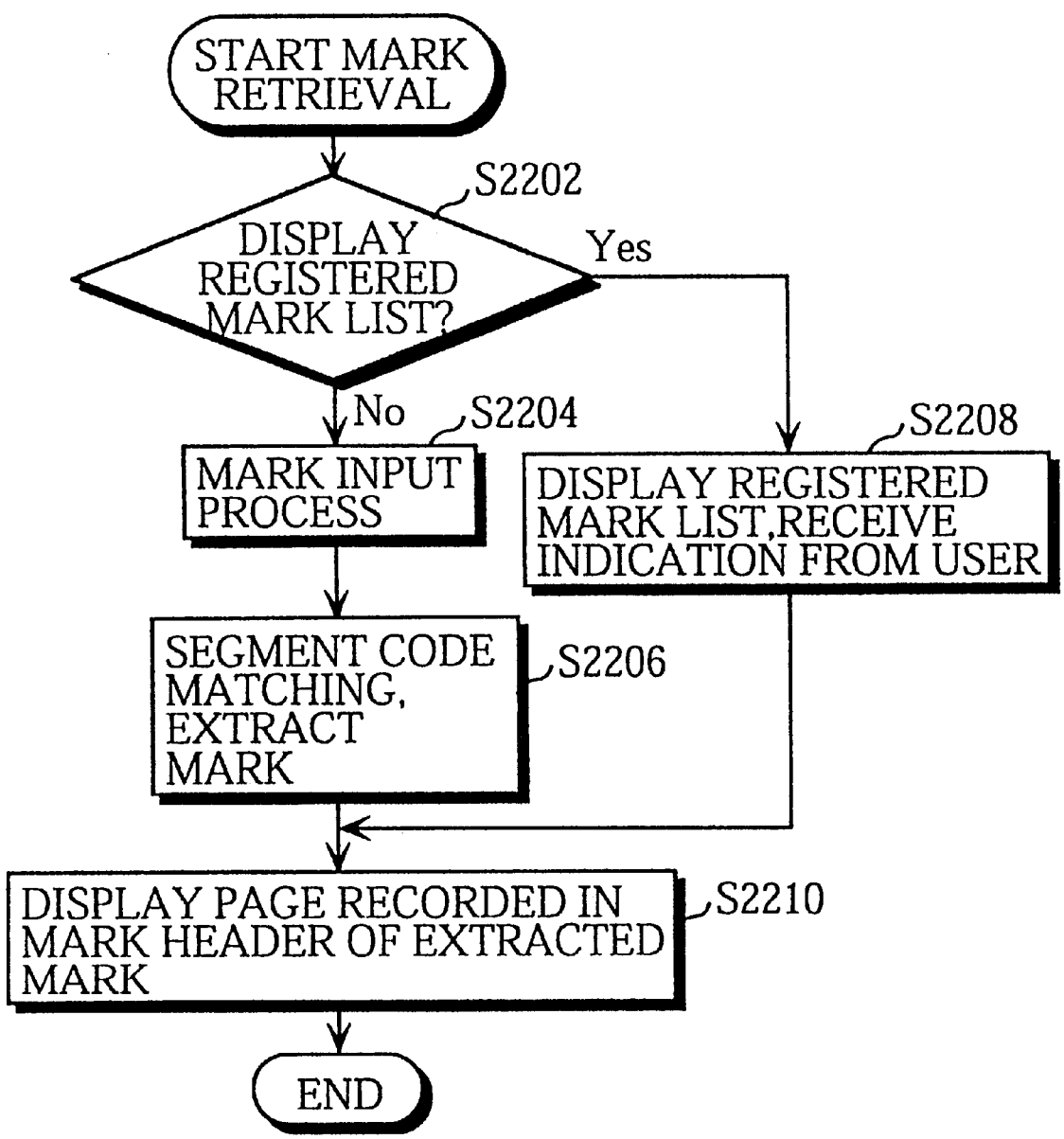
FIG. 22 is a flowchart of the operation of the control unit during mark retrieval in the embodiment.
Figure 23:
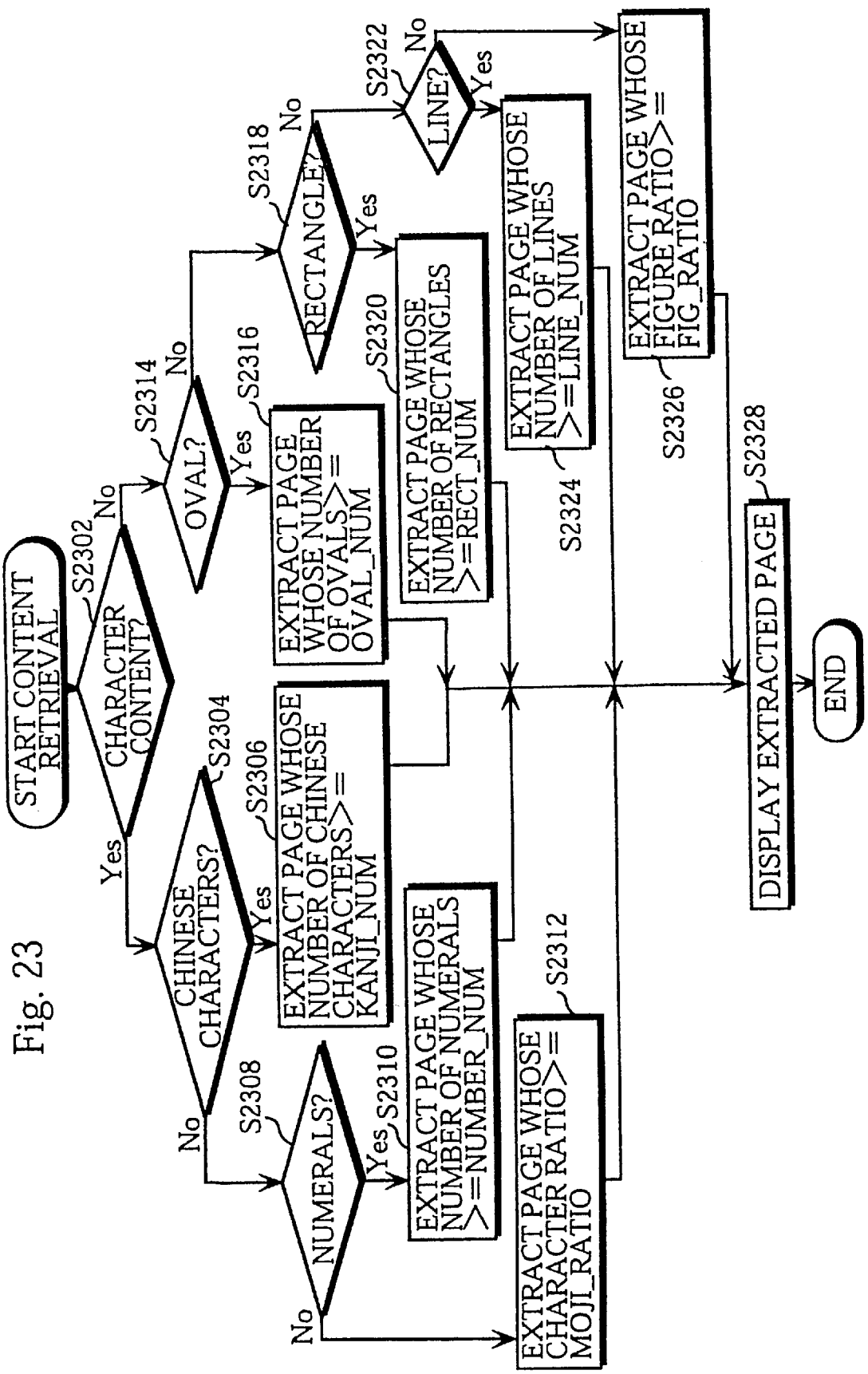
FIG. 23 is a flowchart of the operation of the control unit during content retrieval in the embodiment.

The control unit 105 reads the number of numerals of each page header stored in the handwritten memo database 102 sequentially and compares the read number of numerals of each page with the threshold value "NUMBER_NUM" stored in its memory beforehand. The control unit 105 reads each page having a number of numerals which is equal to or greater than the "NUMBER_NUM," sequentially. The control unit 105 has the display unit 104 display the stroke data of the read pages at a predetermined size, as shown in FIG. 16. In this figure, the "4/21 PAGES" displayed in the top field 1602 indicates that 21 pages include a large number of numeric contents and that 4 pages out of the 21 pages are being displayed.

The user can see the remaining 17 pages that include a large number of numeric contents sequentially by tapping the pen 203 on the next page figure 1601.

Note that the threshold value "NUMBER_NUM" may be preset to the value "5" in the control unit 105. In this case, each page including five or more numeric characters is displayed. This threshold value "NUMBER_NUM" is changeable.

Similarly, the threshold value "KANJI_NUM" for retrieving pages including large numbers of Chinese character contents and the threshold value "MOJI_RATIO" for retrieving pages including large numbers of character contents are preset. When the threshold "MOJI_RATIO" is preset to "50," for instance, pages where 50% or more of the strokes compose characters are extracted.

When the user indicates "PICTORIAL CONTENT" 1701 with the pen 203, the auxiliary menu 1702 is displayed on the display unit 104. The auxiliary menu 1702 is composed of four menu items, namely "OVAL" 1703, "RECTANGLE" 1704, "LINE" 1705, and "ALL FIGURES" 1706.

When the user indicates "OVAL" 1703 with the pen 203, the input unit 101 outputs an indication signal of ovals to the control unit 105. The control unit 105 reads the number of ovals in each page header stored in the handwritten memo database 102, a set of stroke data of each page whose number of ovals is equal to or greater than the threshold value "OVAL_NUM" stored in its memory is extracted. The extracted set of stroke data of each page is displayed on the display unit 104 at a predetermined size. When the threshold value "OVAL_NUM" is set to "1", for instance, pages which each include at least one oval figure are extracted and displayed.

Similarly, when the user indicates "RECTANGLE" 1704, pages which include a number of rectangular figures that is equal to or greater than the threshold value "RECT_NUM" are displayed; when the user indicates "LINE" 1705, pages which include a number of lines that is equal to or greater than the threshold value "LINE_NUM" is displayed; when the user indicates "ALL FIGURES" 1706, pages which have a figure ratio equal to or greater than the threshold value "FIG_RATIO" are displayed. When the user indicates "ALL FIGURES" 1706 and the "FIG_RATIO" is set to "20", for instance, each page where 20% or more of the strokes compose figures is displayed.

The following is a description of the operation of this embodiment, with reference to the flowcharts in FIGS. 18–23.

When the user selects handwriting input mode and inputs handwritten data from the input unit 101, the control unit 105 receives coordinate data inputted from the input unit 101, generates stroke data from the coordinate data, and writes the stroke data in the handwritten memo database 102 (S1802). The control unit 105 continues this process until a next page signal is inputted from the input unit 101 (S1804). When the next page signal is inputted, the control unit 105 classifies stroke data into characters and figures and generates character headers and figure headers (S1806).

The control unit 105 calculates the total number of strokes "S" included in the generated character and figure headers, obtains the number of strokes composing characters "SC" included in the character headers and the number of strokes composing figures "SF" included in the figure headers, and calculates the character ratio by dividing "SC" by "S" and the figure ratio by dividing "SF" by "S." The calculated character and figure ratios are written in the page header (S1808).

The control unit 105 performs a line of text and character distinguishing process to generate character headers and character blocks (S1810) and performs a page attribute value setting process (S1812).

The page attribute value setting process in S1812 is described in detail below.

The control unit 105 sets the value of the pointer to first block of the page header stored in the handwritten memo database 102 in the variable "block" (S1902) and judges whether the first block is a character block (S1904). When the first block is judged to be a character block, the control unit 105 sets the value of the pointer of first character in the variable "charHeader" (S1906). The control unit 105 reads the number of strokes of the character header specified by the value of the variable "charHeader" and judges whether the number of strokes exceeds "2" (S1908). When the number of strokes exceeds "2," the control unit 105 increments the number of Chinese characters of the block header and of the page header by one (S1910). When the number of strokes does not exceed "2," the control unit 105 increments the number of numerals of the block header and of the page header by one (S1912). After the process in S1910 or S1912, the control unit 105 sets the value of the pointer to next character in the variable "charHeader" (S1914). The control unit 105 judges whether the value of the variable "charHeader" is NULL, that is, whether the variable "charHeader" is blank (S1916). When the variable "charHeader" is not blank, the process returns to S1908; when the variable "charHeader" is blank, the process proceeds to S1930.

When the first block is not judged to be a character block in S1904, that is, the block is judged to be a figure block, the control unit 105 sets the value of the pointer to first figure in the variable "figHeader" (S1918). The control unit 105 checks a set of successive stroke data connected to the pointer to first stroke of a figure header specified by the value of the variable "figHeader", recognizes the shape of the figure composed by the stroke data (S1920), and writes a shape value, namely an oval, a rectangle, or a line, in the shape of the figure header according to the shape recognition result (S1922). The control unit 105 increments the value of the number of ovals, the number of rectangles, or the number of lines, of the block header and of the page header according to the shape value written in S1922 (S1924). The control unit 105 assigns the value of the pointer to next figure to the variable "figHeader" (S1926) and judges whether the value of the "figHeader" is NULL (whether the "figHeader" is blank) (S1928). When the value is not NULL, the process returns to S1920; when the value is NULL, the process proceeds to S1930.

The control unit 105 assigns the value of the pointer to next block of the block header to the variable "block" in S1930, and judges whether the value of the variable "block" is NULL (S1932). When the "block" is NULL, this process of one page is complete; when the "block" is not NULL, the process returns to S1904.

The following is a description of the operation for adding a mark to a page of inputted handwritten data.

The control unit 105 judges whether a free mark is to be inputted (S2002). When the user does not select free mark input mode, the control unit 105 has the display unit 104 display a list of registered marks to allow the user to indicate a registered mark in the list (S2004). Then the process proceeds to S2008. When the user selects free mark input mode, the control unit 105 performs a mark input process to generate a mark header. Then the process proceeds to S2008.

In S2008, the control unit 105 writes the page number of the page being displayed in the related page header of the mark header or of the mark relation table corresponding to the mark added to handwritten data of the page. The control unit 105 receives an indication of whether the added mark is to be displayed. When the added mark is to be displayed, the control unit 105 further receives an indication of the position where to display the mark and an indication of a size for displaying the mark (S2010). This completes the process.

The following is a detailed description of the mark input process in S2006.

When the input unit 101 receives an input of a free mark from the user, the control unit 105 receives coordinate data of the handwritten data, generates stroke data from the coordinate data, and stores the stroke data in the mark database 103 (S2102). On receiving a determination signal from the input unit 101 (S2104), the control unit 105 generates segment codes where characteristics of stroke data of the mark are extracted and writes the segment codes in the mark header (S2106). This completes the process.

The operation for a mark retrieval is described below.

The control unit 105 judges whether a retrieval mark is to be selected from a list of registered marks and is inputted (S2202). If not so, the same process as the mark input process from S2102 to S2106 is performed so that the user can input a free mark (S2204).

The control unit 105 calculates the degree of similarity between segment codes of the inputted free mark and those of a mark of each mark header stored in the mark database 103, and extracts mark headers of marks where the degree of similarity of segment codes exceeds a predetermined value (S2206). Then the process proceeds to S2210.

When the control unit 105 judges that a list of registered marks is to be displayed in S2202, the control unit 105 has the display unit 104 display the list of registered marks to allow the user to indicate a registered mark from the list (S2208). Then the process proceeds to S2210.

In S2210, the control unit 105 reads page numbers of the related page header of the mark header extracted in S2206 or page numbers of the related page header corresponding to the registered mark indicated in S2208 in the mark relation table. The control unit 105 reads stroke data of pages of the read page numbers from the handwritten memo database 102 and has the display unit 104 display the read stroke data as the retrieval result (S2210). Then this process is completed.

The following is a description of the operation for retrieving according to the contents of each page of handwritten data.

The control unit 105 judges which of an indication signal of "CHARACTER CONTENT" or an indication signal of "PICTORIAL CONTENT" is inputted from the input unit 101 (S2302). When it is judged that the indication signal of "CHARACTER CONTENT" is inputted in S2302, the control unit 105 further judges whether an indication signal of "CHINESE CHARACTER CONTENT" is inputted (S2304). If so, the control unit 105 compares the number of Chinese characters of each page header stored in the handwritten memo database 102 with the predetermined threshold value "KANJI_NUM" to extract the stroke data of each page including a number of Chinese characters that is equal to or greater than the threshold value "KANJI_NUM" (S2306).

The control unit 105 has the display unit 104 display the read stroke data at a predetermined size (S2328). By doing so, pages which include a number of Chinese characters that is equal to or greater than the threshold value are displayed.

When the indication signal of "CHINESE CHARACTER CONTENT" is not judged to have been inputted in S2304, it is judged whether an indication signal of "NUMERIC CONTENT" has been inputted (S2308). When the indication signal of "NUMERIC CONTENT" is judged to have been inputted, the stroke data of each page including a number of numerals that is equal to or greater than the threshold value NUMBER_NUM is read in the same manner as in S2306 (S2310). Then the process proceeds to S2328. By doing so, pages which include a number of numerals that is equal to or greater than the threshold value are displayed.

When the indication signal of "NUMERIC CONTENT" is not judged to have been inputted in S2308, pages where the ratio of stroke data for characters to all stroke data is equal to or greater than the threshold value "MOJI_RATIO" are read (S2312), and the process proceeds to S2328. By doing so, pages which include large numbers of character contents are displayed.

When the indication signal of "CHARACTER CONTENT" is not judged to have been inputted in S2302, the control unit 105 judges whether an indication signal of "OVAL" has been inputted (S2314). If so, a set of stroke data of each page including a number of ovals that is equal to or greater than the threshold value "OVAL_NUM" is read (S2316), and this process proceeds to S2328. By doing so, pages which include a number of ovals that is equal to or greater than the threshold value in this handwritten contents are displayed.

When the indication signal of "OVAL" is not judged to have been inputted in S2314, the control unit 105 judges whether an indication signal of "RECTANGLE" has been inputted (S2318). If so, the stroke data of each page including a number of rectangles that is equal to or greater than the threshold value "RECT_NUM" is read (S2320), and this process proceeds to S2328. By doing so, pages which include a number of rectangles that is equal to or greater than the threshold value are displayed.

When the indication signal of "RECTANGLE" is not judged to have been inputted in S2318, the control unit 105 judges whether an indication signal of "LINE" has been inputted (S2322). If so, the stroke data of each page including a number of lines that is equal to or greater than the threshold value "LINE_NUM" is read (S2324), as in S2316, and this process proceeds to S2328. By doing so, pages which include a number of lines that is equal to or greater than the threshold value are displayed.

When the indication signal of "LINE" is not judged to have been inputted in S2322, pages where the ratio of stroke data for figures to all stroke data is equal to or greater than the threshold value "FIG_RATIO" are read (S2326), and the process proceeds to S2328. By doing so, pages which include large number of figure contents whose ratio is equal to or greater than the threshold value are displayed.

As described above, by referring to information of page headers of the handwriting management data 302 stored in the handwritten memo database 102, pages including character contents, pages including Chinese characters, pages including numerals, pages including figure contents, pages including ovals, pages including rectangles, or pages including lines are easily retrieved and displayed.

Although the control unit 105 retrieves and displays handwritten data in each page in this embodiment, the control unit 105 may retrieve the handwritten data in smaller management unit, such as in each block, by referring to block headers.

Although the mark-matching (matching for sets of strokes) is performed using segment codes in this embodiment, any other data may be used for this mark-matching as far as the other data represents characteristics of a set of stroke sets. As disclosed in U.S. Pat. No. 5,553,284, for instance, characteristics of stroke set may be represented with HMM (Hidden Markov Model) and handwritten data may be retrieved using the HMM.

Figure 24:
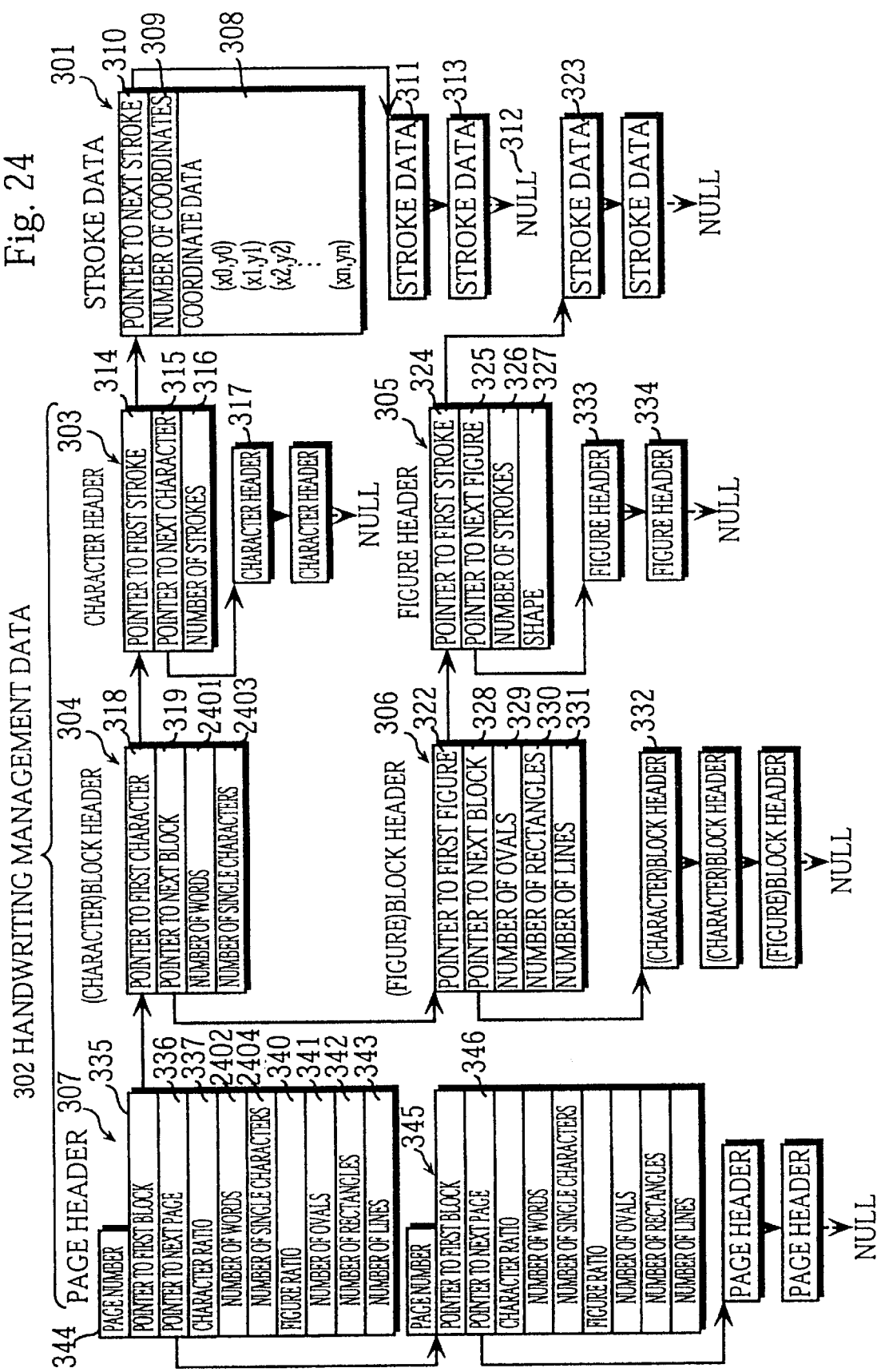
FIG. 24 shows another example of the structure of the stroke data and the handwriting management data of the handwritten data stored in the handwritten memo database of the embodiment.

In this embodiment, as shown in FIG. 3, the control unit 105 classifies stroke data classified for characters into Chinese characters and numerals, counts the number of the Chinese characters and the number of the numerals, and writes the number of the Chinese characters in the numbers of Chinese characters 320 and 338 of the character block header 304 and the page header 307 and the number of the numerals in the numbers of numerals 321 and 339 of the character block header 304 and the page header 307, respectively. However, as shown in FIG. 24, classified stroke data may be written in the numbers of words 2401 and 2402, and the numbers of single characters 2403 and 2404, instead of the numbers of Chinese characters 320 and 338, and the numbers of numerals 321 and 339.

When handwritten data of English, instead of Japanese, is inputted, the handwritten data is often inputted by writing a word using the running hand. In this case, the control unit 105 interpolates each piece of coordinate data of the stroke data 301 with lines and counts the number of segments which represent almost straight lines. If the segment codes shown in FIG. 4B are used, handwritten data is classified into words and single characters by using a predetermined threshold value concerning the number of segments. When the predetermined threshold value is set to "20," for instance, characters composed of segments whose number exceeds "20" are classified into words; characters composed of segments whose number is equal to or smaller than "20" are classified into single characters (numerals and letters).

The control unit 105 counts the number of the classified words and writes the number in the numbers of words 2401 and 2402, and counts the number of the classified single characters and writes the number in the numbers of single characters 2403 and 2404.

Although handwritten data is classified into words and single characters according to the number of segments in the above description, the handwritten data may be classified using a length-to-width ratio as described below.

The control unit 105 calculates the difference "dx" between the maximum "x" and the minimum "x" and the difference "dy" between the maximum "y" and the minimum "y" of coordinate data of the stroke data 301, namely (x0, y0), (x1, y1), . . . , and (xn, yn), and calculates the length-to-width ratio "R" by dividing "dx" by "dy." The control unit 105 judges handwritten data having "R" value exceeding a threshold value ("2" for instance) as a word, and judges handwritten data having "R" value not exceeding the threshold value as a single character.

Figure 25:
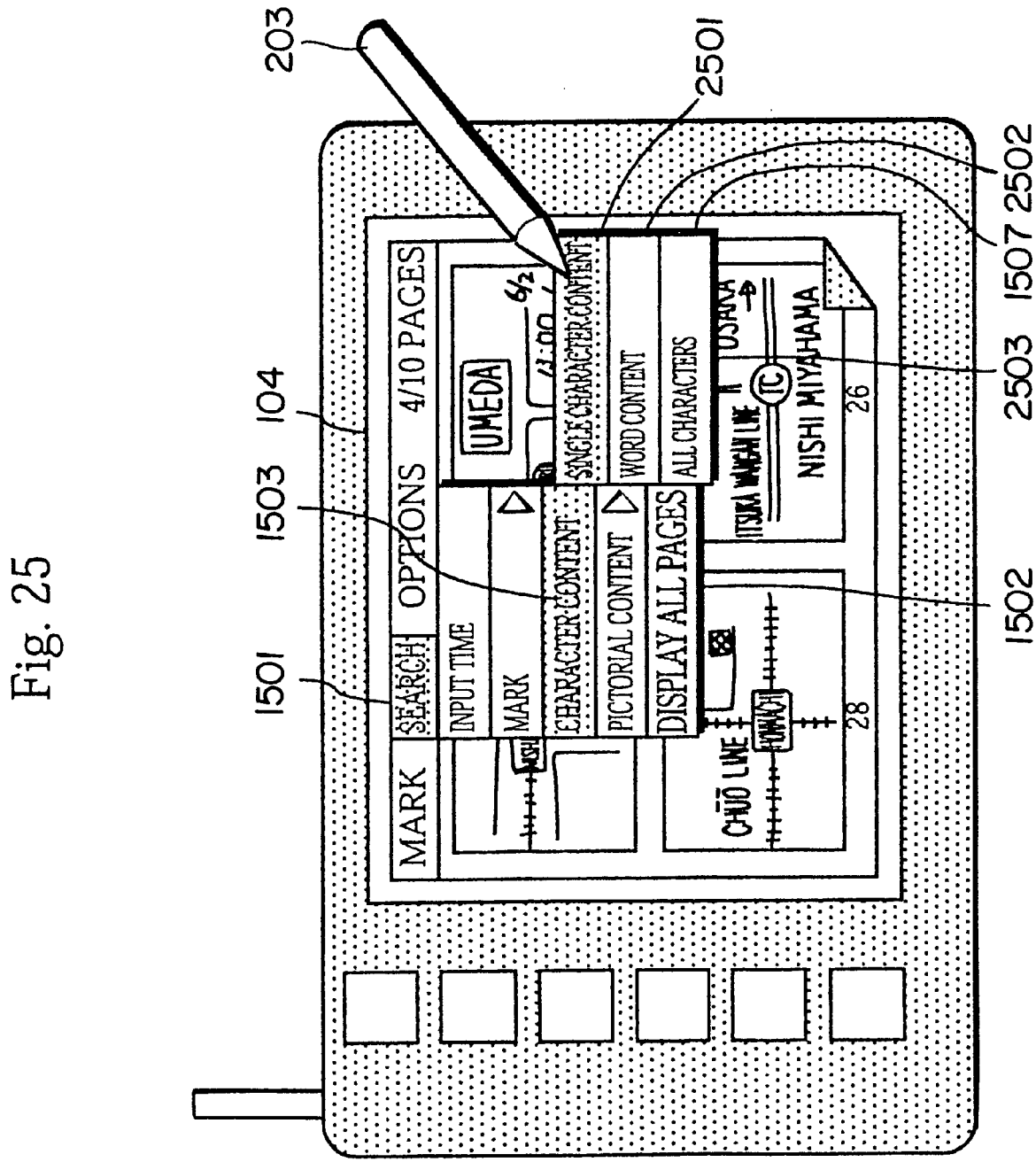
FIG. 25 shows a state where the user indicates character content retrieval in the embodiment.

As described above, by making the handwriting management data 2405 include the number of words 2402 and the number of single characters 2404, the auxiliary menu 2503 including "SINGLE CHARACTER CONTENT" 2501 and the "WORD CONTENT" 2502 may be used during retrieval as shown in FIG. 25. Therefore, the user can indicate "SINGLE CHARACTER CONTENT" 2501 with the pen 203 to retrieve pages which each include a large number of single character contents in handwritten contents.

Handwritten data may be classified into words and single characters with both of the method using the number of segments and the method using the length-to-width ratio. In this case, the accuracy of the classification is improved.

In the present embodiment, the handwritten memo database 102 stores various kinds of data such as stroke data of handwritten data inputted from the input unit 101. However, when the information retrieval apparatus of this embodiment includes the information obtaining unit 2601, the handwritten memo database 102 may store other data such as image data obtained by the information obtaining unit 2601.

Figure 26:
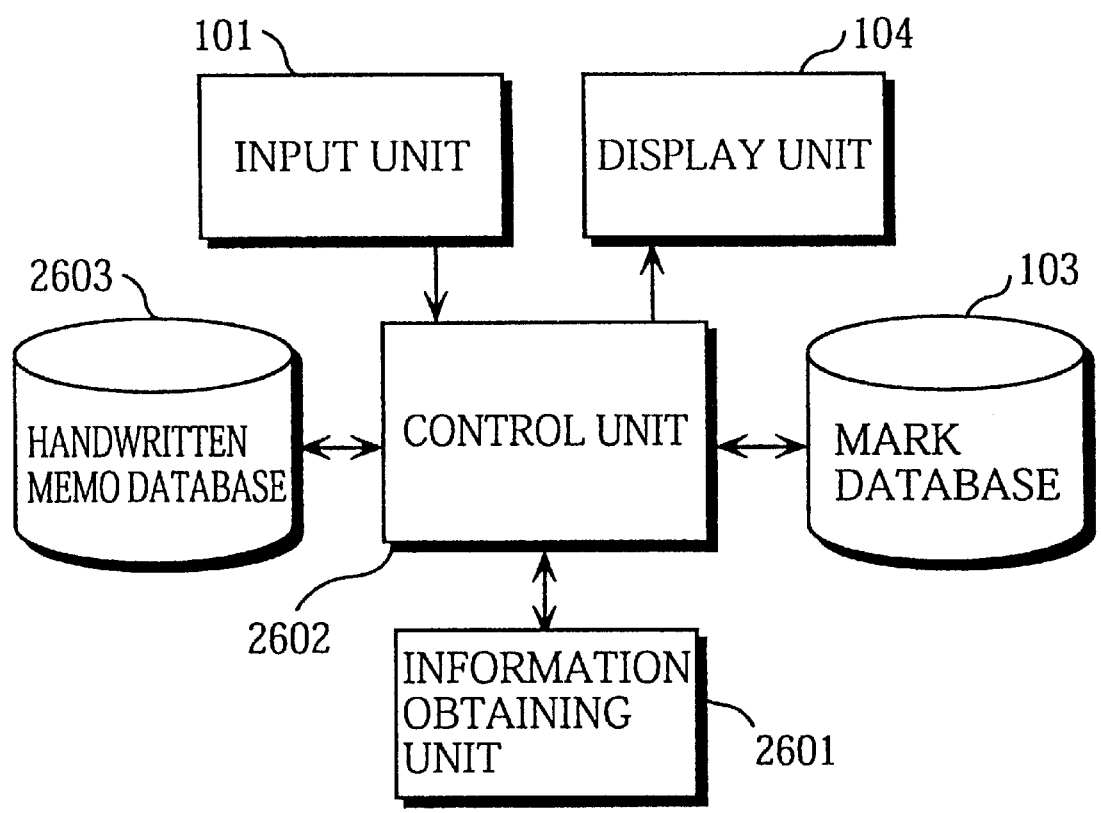
FIG. 26 shows the structure of the information retrieval apparatus of a modification of the embodiment of the present invention.

As one example, the information obtaining unit 2601 may be connected to a public network (not shown in FIG. 26) and may obtain image data from the Internet according to instructions outputted from the control unit 2602. The obtained image data is displayed on the display unit 104 and is stored in the handwritten memo database 2603 with a page number given to the obtained image data, in accordance with instructions outputted from the control unit 2602.

The user inputs a retrieval mark for retrieving the image data displayed on the display unit 104 from the input unit 101 in the same manner as in the above embodiment. This retrieval mark and the page number given to the image data are related to each other and are stored in the mark database 103.

Figure 27:
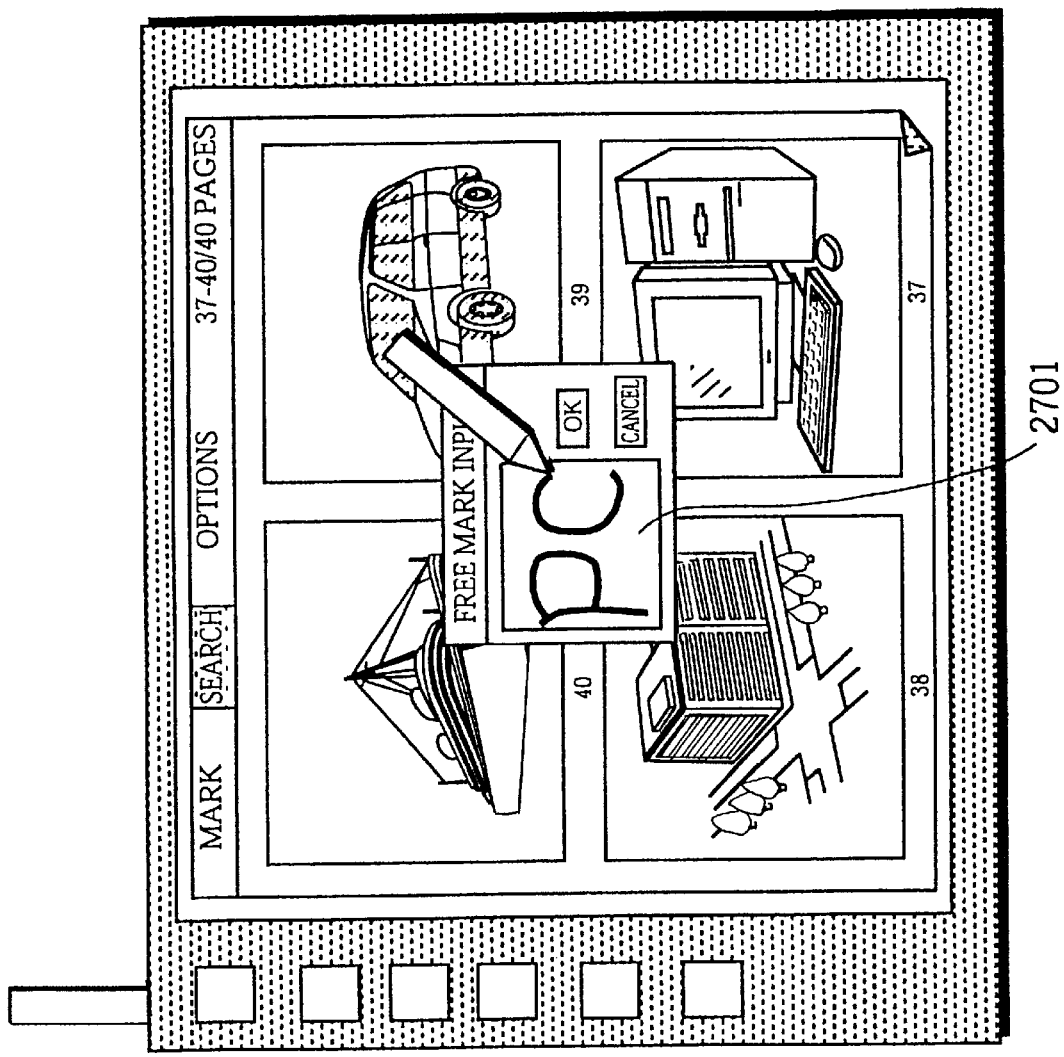
FIG. 27 shows a state where the user inputs a retrieval mark in the modification.

When a retrieval mark is given to obtained image data in this manner, the image data can be retrieved using this retrieval mark. FIG. 27 shows a state where the retrieval free mark 2701 is inputted. The control unit 2602 obtains page numbers of image data given this retrieval free mark 2701 by referring to the mark database 103 in the same manner as in the above embodiment.

Figure 28:
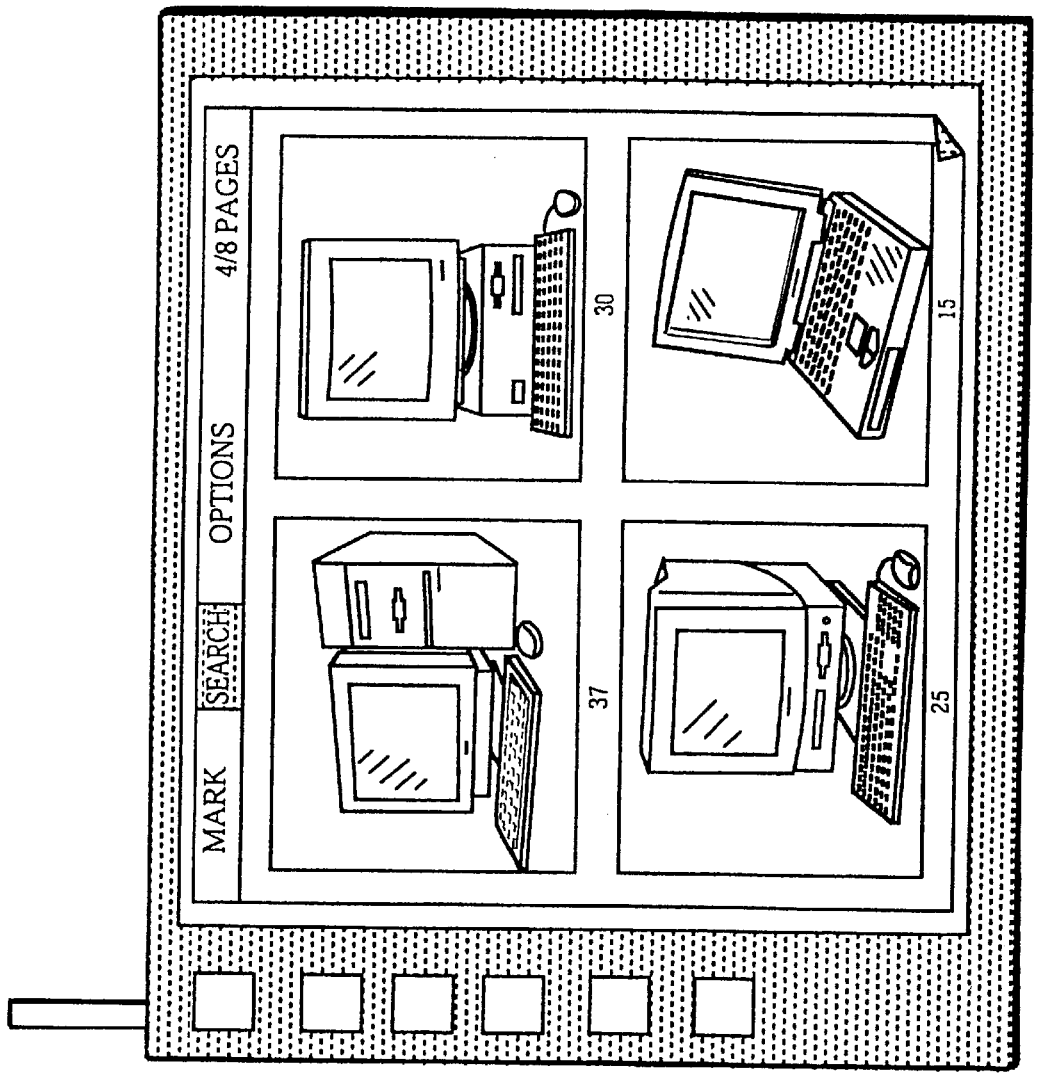
FIG. 28 shows a result of the mark retrieval in the modification.

As a result, image data given the retrieval free mark 2701 is displayed on the display unit 104 as shown in FIG. 28. As described above, image data can be easily retrieved by making the retrieval free mark 2701 a mark (a design) which allows the user to picture the contents of image data. Note that the retrieval free mark 2701 is a mark which allows the user to picture a personal computer (PC).

The information retrieval apparatus of the above embodiment is achieved by executing a program in a CPU of a portable terminal apparatus or the like, with the necessary information being held by a disk device or a storage device such as a memory. Software including this program may be distributed in the software market via a recording medium, such as a floppy disk or an optical disk, or a transporting medium, such as a network, so that the software can be handled as package software or a program to be downloaded.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information retrieval apparatus comprising:

an input unit for receiving handwritten input from a user;

a stroke data set extracting means for extracting stroke data sets, wherein each stroke data set is a collection of data representing strokes in the handwritten input made by the user;

an identifier assigning unit for grouping the stroke data sets into predetermined groups and assigning a group identifier to each predetermined group;

a storage means for storing each predetermined group and the corresponding group identifier;

a design input receiving unit for receiving at least one handwritten design input inputted by the user;

a design stroke data set extracting unit for extracting a design stroke data set from each handwritten design input, wherein the storage means includes a design stroke data storage unit for storing the extracted design stoke data sets;

a design characteristic extracting unit for extracting characteristics of each design stroke data set;

a design appending means for appending each design stroke data set to one of the predetermined groups, in accordance with an indication given by the user;

a design management information generating means for generating information that associates each design stroke data set with the characteristics of the design stroke data set, and the group identifier corresponding to the predetermined group to which each design stroke data set has been appended, wherein the design management information is stored in the storage means;

a retrieval information receiving means for receiving a handwritten retrieval design input inputted by the user;

a retrieval design stroke data set extracting unit for extracting a retrieval design stroke data set from the handwritten retrieval design input;

a retrieval design characteristic extracting unit for extracting characteristics of the retrieval design stroke data set;

a design selecting unit for comparing the characteristics of each design stroke data set in the storage means with the characteristics of the retrieval design stroke data set, and selecting at least one of the design stroke data sets according to the degree of similarity between the characteristics of each design stroke data set and the characteristics of the retrieval design stroke data set;

a selected identifier extracting unit for extracting the group identifiers corresponding to the predetermined groups to which the selected design stroke data sets have been appended; and a display means for displaying the stroke data sets in the predetermined groups corresponding to the group identifiers extracted by the retrieval means.

2. The information retrieval apparatus defined in claim 1, wherein data for each stroke in a handwritten design is expressed by coordinate points that are detected at a predetermined interval, and the design characteristic extracting unit detects a direction of at least one straight line that passes a plurality of coordinate points in a stroke and a direction of a straight line which joins an end point of a stroke with a start point of a next stroke, and converts the detected directions into normalized codes.

3. The information retrieval apparatus defined in claim 2, wherein data for each stroke in a retrieval handwritten design is expressed by coordinate points that are detected at a predetermined interval, and the retrieval design characteristic extracting unit detects a direction of at least one straight line that passes a plurality of coordinate points in a stroke in the retrieval handwritten design and a direction of a straight line which joins an end point of a stroke with a start point of a next stroke in the retrieval handwritten design, and converts the detected directions into normalized codes, wherein the design selection unit calculates a degree of similarity between the codes obtained by the design characteristic extracting unit with the codes obtained by the retrieval design extracting unit using a dynamic programming matching method.

4. The information retrieval apparatus defined in claim 3, further comprising:

a design display receiving means for receiving an instruction as to whether to have the display means display the design appended by the design appending means, wherein when the design display receiving means receives an instruction to have the design displayed, the display means reads and displays, in addition to displaying a stroke data set, an appended design stroke data set stored in the design stroke data set storage unit.

5. The information retrieval apparatus defined in claim 3, wherein the design selection unit selects at least one design stroke data set with a degree of similarity that exceeds a predetermined threshold value.

6. The information retrieval apparatus defined in claim 1, wherein the design selection unit selects at least one design stroke data set with a degree of similarity that exceeds a predetermined threshold value.

7. An information retrieval apparatus comprising:

an input unit for receiving handwritten input from a user;

a stroke data set extracting means for extracting stroke data sets, wherein each stroke data set is a collection of data representing strokes in the handwritten input made by the user;

a classification means for classifying each stroke data set as one of a character and a figure;

an identifier assigning unit for grouping the stroke data sets into predetermined groups and assigning a group identifier to each predetermined group;

a storage means for storing the stroke data sets along with their classification and the group identifier for each predetermined group;

a calculating means for calculating a character ratio and a figure ratio for each predetermined group, wherein the character ratio for each predetermined group is calculated by dividing the total number of strokes in the stroke data sets classified as a character in the predetermined group by the total number of strokes in the predetermined group, the figure ratio for each predetermined group is calculated by diving the total number of strokes in the stroke data sets classified as a figure in the predetermined group by the total number of strokes in the predetermined group, and the character and figure ratio for each predetermined group is stored in the storage means;

a display means for reading and displaying the stroke data sets to the user;

a retrieval menu display controlling means for having the display unit display a character menu item and a figure menu item to the user;

a retrieval information receiving means for receiving retrieval information inputted by the user, wherein the retrieval information is a designation of one of the menu items displayed by the display unit;

a retrieval means for extracting each group identifier corresponding to a predetermined group having a character ratio equal to or greater than a predetermined threshold when the retrieval information receiving means receives the character menu item, and extracting each group identifier corresponding to a predetermined group having a figure ratio equal to or greater than a predetermined threshold when the information receiving means receives the figure menu item;

wherein the display means reads from the storage means and displays the predetermined groups corresponding to the group identifiers extracted from the retrieval means.

8. The information retrieval apparatus defined in claim 7, wherein the classification means includes:
a character classification unit for classifying each stroke data set that has been classified as a character as one of a Chinese character and a numeral, according to whether a number of strokes that composes a character of the stroke data set exceeds a predetermined threshold value;
a first calculating unit for calculating a number of Chinese characters and a number of numerals in each predetermined group of stroke data sets; and
a first additional writing unit for writing the number of Chinese characters and the number of numerals calculated by the first calculating unit into the characteristic storage unit so as to correspond to an identifier of the predetermined group for which the number of Chinese characters and the number of numerals were calculated, the retrieval menu display controlling means includes:
a first auxiliary menu display control unit for having the display means display a Chinese character auxiliary menu item for retrieving predetermined groups of the stroke data sets according to the number of Chinese characters and a numeral auxiliary menu item for retrieving predetermined groups of the stroke data sets according to the number of numerals, the retrieval means includes:
a first extracting unit for extracting an identifier of each predetermined group whose number of Chinese characters is either of equal to and greater than a predetermined value when the retrieval information receiving means receives the Chinese character auxiliary menu, and extracting an identifier of each predetermined group whose number of numerals is either of equal to and greater than a predetermined value when the retrieval information receiving means receives the numeral auxiliary menu.

9. The information retrieval apparatus defined in claim 8, wherein the classification means further includes:
a segment classification unit for classifying each stroke data set that has been classified as a character as one of a word and a single character, according to whether a number of segments that composes a character of the stroke data set exceeds a predetermined threshold value;
a second calculating unit for calculating a number of words and a number of single characters in each predetermined group of stroke data sets; and
a second additional writing unit for writing the number of words and the number of single characters calculated by the second calculating unit into the characteristic storage unit so as to correspond to an identifier of the predetermined group for which the number of words and the number of single characters were calculated, the retrieval menu display controlling means further includes:
a second auxiliary menu display control unit for having the display means display a word auxiliary menu item for retrieving predetermined groups of the stroke data sets according to the number of words and a single character auxiliary menu item for retrieving predetermined groups of the stroke data sets according to the number of single characters, the retrieval means further includes:
a second extracting unit for extracting an identifier of each predetermined group whose number of words is either of equal to and greater than a predetermined value when the retrieval information receiving means receives the word auxiliary menu, and extracting an identifier of each predetermined group whose number of single characters is either of equal to and greater than a predetermined value when the retrieval information receiving means receives the single character auxiliary menu.

10. The information retrieval apparatus defined in claim 9, wherein the classification means further includes:
a figure classification unit for classifying each stroke data set that has been classified as a figure and conforms to a predetermined condition as one of an oval, a rectangle, and a straight line;
a third calculating unit for calculating a number of ovals, a number of rectangles, and a number of straight lines in each predetermined group of stroke data sets; and
a third additional writing unit for writing the number of ovals, the number of rectangles, and the number of straight lines calculated by the third calculating unit into the characteristic storage unit so as to correspond to an identifier of the predetermined group for which the number of ovals, the number of rectangles, and the number of straight lines were calculated, the retrieval menu display controlling means further includes:
a third auxiliary menu display control unit for having the display means display an oval auxiliary menu item for retrieving predetermined groups of the stroke data sets according to the number of ovals, a rectangle auxiliary menu item for retrieving predetermined groups of the stroke data sets according to the number of rectangles, and a straight line auxiliary menu item for retrieving predetermined groups of the stroke data sets according to the number of straight lines, the retrieval means further includes:
a third extracting unit for extracting an identifier of each predetermined group whose number of ovals is either of equal to and greater than a predetermined value when the retrieval information receiving means receives the oval auxiliary menu, extracting an identifier of each predetermined group whose number of rectangles is either of equal to and greater than a predetermined value when the retrieval information receiving means receives the rectangle auxiliary menu, and extracting an identifier of each predetermined group whose number of straight lines is either of equal to and greater than a predetermined value when the retrieval information receiving means receives the straight line auxiliary menu.

11. The information retrieval apparatus defined in claim 8, wherein
the classification means further includes:
a length-to-width ratio classification unit for classifying each stroke data set that has been classified as a character as one of a word and a single character, according to whether a length-to-width ratio of a character of the stroke data set exceeds a predetermined threshold value;
a fourth calculating unit for calculating a number of words and a number of single characters in each predetermined group of stroke data sets; and
a fourth additional writing unit for writing the number of words and the number of single characters calculated by the fourth calculating unit into the characteristic storage unit so as to correspond to an identifier of the predetermined group for which the number of words and the number of single characters were calculated, the retrieval menu display controlling means further includes:
a fourth auxiliary menu display control unit for having the display means display a word auxiliary menu item for retrieving predetermined groups of the stroke data sets according to the number of words and a single character auxiliary menu item for retrieving predetermined groups of the stroke data sets according to the number of single characters, the retrieval means further includes:
a fourth extracting unit for extracting an identifier of each predetermined group whose number of words is either of equal to and greater than a predetermined value when the retrieval information receiving means receives the word auxiliary menu, and extracting an identifier of each predetermined group whose number of single characters is either of equal to and greater than a predetermined value when the retrieval information receiving means receives the single character auxiliary menu.

12. The information retrieval apparatus defined in claim 7, wherein
the classification means further includes:
a segment classification unit for classifying each stroke data set that has been classified as a character as one of a word and a single character, according to whether a number of segments that composes a character of the stroke data set exceeds a predetermined threshold value;
a second calculating unit for calculating a number of words and a number of single characters in each predetermined group of stroke data sets; and
a second additional writing unit for writing the number of words and the number of single characters calculated by the second calculating unit into the characteristic storage unit so as to correspond to an identifier of the predetermined group for which the number of words and the number of single characters were calculated, the retrieval menu display controlling means further includes:
a second auxiliary menu display control unit for having the display means display a word auxiliary menu item for retrieving predetermined groups of the stroke data sets according to the number of words and a single character auxiliary menu item for retrieving predetermined groups of the stroke data sets according to the number of single characters, the retrieval means further includes:
a second extracting unit for extracting an identifier of each predetermined group whose number of words is either of equal to and greater than a predetermined value when the retrieval information receiving means receives the word auxiliary menu, and extracting an identifier of each predetermined group whose number of single characters is either of equal to and greater than a predetermined value when the retrieval information receiving means receives the single character auxiliary menu.

13. The information retrieval apparatus defined in claim 7, wherein
the classification means further includes:
a figure classification unit for classifying each stroke data set that has been classified as a figure and conforms to a predetermined condition as one of an oval, a rectangle, and a straight line;
a third calculating unit for calculating a number of ovals, a number of rectangles, and a number of straight lines in each predetermined group of stroke data sets; and
a third additional writing unit for writing the number of ovals, the number of rectangles, and the number of straight lines calculated by the third calculating unit into the characteristic storage unit so as to correspond to an identifier of the predetermined group for which the number of ovals, the number of rectangles, and the number of straight lines were calculated, the retrieval menu display controlling means further includes:
a third auxiliary menu display control unit for having the display means display an oval auxiliary menu item for retrieving predetermined groups of the stroke data sets according to the number of ovals, a rectangle auxiliary menu item for retrieving predetermined groups of the stroke data sets according to the number of rectangles, and a straight line auxiliary menu item for retrieving predetermined groups of the stroke data sets according to the number of straight lines, the retrieval means further includes:
a third extracting unit for extracting an identifier of each predetermined group whose number of ovals is either of equal to and greater than a predetermined value when the retrieval information receiving means receives the oval auxiliary menu, extracting an identifier of each predetermined group whose number of rectangles is either of equal to and greater than a predetermined value when the retrieval information receiving means receives the rectangle auxiliary menu, and extracting an identifier of each predetermined group whose number of straight lines is either of equal to and greater than a predetermined value when the retrieval information receiving means receives the straight line auxiliary menu.

14. The information retrieval apparatus defined in claim 7, wherein
the classification means further includes:
a length-to-width ratio classification unit for classifying each stroke data set that has been classified as a character as one of a word and a single character, according to whether a length-to-width ratio of a character of the stroke data set exceeds a predetermined threshold value;
a fourth calculating unit for calculating a number of words and a number of single characters in each predetermined group of stroke data sets; and
a fourth additional writing unit for writing the number of words and the number of single characters calculated by the fourth calculating unit into the characteristic storage unit so as to correspond to an identifier of the predetermined group for which the number of words and the number of single characters were calculated,
the retrieval menu display controlling means further includes:
a fourth auxiliary menu display control unit for having the display means display a word auxiliary menu item for retrieving predetermined groups of the stroke data sets according to the number of words and a single character auxiliary menu item for retrieving predetermined groups of the stroke data sets according to the number of single characters,
the retrieval means further includes:
a fourth extracting unit for extracting an identifier of each predetermined group whose number of words is either of equal to and greater than a predetermined value when the retrieval information receiving means receives the word auxiliary menu, and extracting an identifier of each predetermined group whose number of single characters is either of equal to and greater than a predetermined value when the retrieval information receiving means receives the single character auxiliary menu.

15. An information retrieval apparatus comprising:
an image data obtaining means for obtaining image data sets from an outside source;
an identifier means for assigning an identifier to each image data set;
a storage means for storing each image data set and the corresponding identifier;
a design input receiving means for receiving at least one handwritten design input from a user,
a design stroke data set extracting means for extracting a design stroke data set from each handwritten design input, wherein each design stroke data set is a collection of data representing the strokes in a handwritten input;
a design characteristic extracting means for extracting characteristics of each design stroke data set;

a design appending means for appending each design stroke data set to one of the image data sets;
a design management information generating means for generating information that associates each design stroke data set with the characteristics of the design stroke data set, and the identifier corresponding to the image data set to which the design stroke data set has been appended, wherein the design management information is stored in the storage means;
a retrieval information receiving means for receiving a handwritten retrieval design input from the user;
a retrieval design stroke data set extracting means for extracting a retrieval design stroke data set from the handwritten retrieval design input, wherein each retrieval design stroke data set is a collection of data representing strokes in a handwritten retrieval design input;
a retrieval design characteristic extracting means for extracting characteristics of the retrieval design stroke data set;
a design selecting means for comparing the characteristics of each design stroke data set in the storage means with the characteristics of the retrieval design stroke data set, and selecting at least one of the design stroke data sets according to the degree of similarity between the characteristics of each design stroke data set and the characteristics of the retrieval design stroke data set;
a selected identifier extracting means for extracting the identifiers corresponding to the image data sets to which the selected design stroke data sets have been appended; and
a display means for displaying the image data sets from the storage means corresponding to the identifiers extracted by the retrieval means.

16. An information retrieval method for an information retrieval apparatus having an input unit, a storage unit, and a display unit, comprising the steps of:
receiving handwritten input by a user from the input unit;
generating stroke data sets, wherein each stroke data set is a collection of data representing strokes in the handwritten input made by the user;
grouping the stroke data sets into predetermined groups;
assigning a group identifier to each predetermined group;
storing each predetermined group and the corresponding group identifier in the storage unit;
receiving at least one handwritten design input from the user;
generating a design stroke data set from each handwritten design input;
extracting characteristics of each design stroke data set;
appending each design stroke data set to one of the predetermined groups, in accordance with an indication given by the user;
generating design management information that associates each design stroke data set with the characteristics of the design stroke data set, and the group identifier corresponding to the predetermined group to which each design stroke data set has been appended;
storing the design management information in the storage means;
receiving a handwritten retrieval design input from the user;
generating a retrieval design stroke data set from the handwritten retrieval design input;

extracting characteristics of the retrieval design stroke data set;

comparing the characteristics of each design stroke data set in the storage means with the characteristics of the retrieval design stroke data set;

selecting at least one of the design stroke data sets according to the degree of similarity between the characteristics of each design stroke data set and the characteristics of the retrieval design stroke data set;

extracting the group identifiers corresponding to the predetermined groups to which the design stroke data sets selected in the selecting step have been appended; and displaying the predetermined groups from the storage means corresponding to the group identifiers extracted in the step extracting the group identifiers on the display unit.

17. An information retrieval apparatus comprising:

an input unit for receiving handwritten input from a user;

a stroke data set extracting means for extracting stroke data sets, wherein each stroke data set is a collection of data representing strokes in the handwritten input made by the user;

a classification means for classifying each stroke data set as one of a character and a figure;

an identifier assigning means for grouping the stroke data sets into predetermined groups and assigning a group identifier to each predetermined group;

a storage means for storing the stroke data sets along with their classification and the group identifier for each predetermined group;

a calculating means for calculating a character ratio and a figure ratio for each predetermined group, wherein the character ratio for each predetermined group is calculated by dividing the total number of strokes in the stroke data sets classified as a character in the predetermined group by the total number of strokes in the predetermined group, the figure ratio for each predetermined group is calculated by diving the total number of strokes in the stroke data sets classified as a figure in the predetermined group by the total number of strokes in the predetermined group, and the character and figure ratio for each predetermined group is stored in the storage means;

a display unit for reading and displaying the stroke data sets to the user; and a retrieval means for extracting group identifiers based on one of the character ratio of each predetermined group and the figure ratio of each predetermined group;

wherein the display unit reads from the storage means and displays the predetermined groups corresponding to the group identifiers extracted from the retrieval means.

18. The information retrieval apparatus of claim 17, wherein the classification means further classifies each stroke data set classified as a character as one of a Chinese character and a numeral, the calculation means calculates the number of stroke data sets classified as a Chinese character and a numeral in each predetermined group, and the retrieval means further extracts group identifiers based on one of the number of Chinese characters in each predetermined group and the number of numerals in each predetermined group.

19. The information retrieval apparatus of claim 17, wherein the classification means further classifies each stroke data set classified as a figure as one of an oval, a rectangle and a straight line, the calculation means calculates the number of stroke data sets classified as a oval, a rectangle and a straight line in each predetermined group, and the retrieval means further extracts group identifiers based on one of the number of ovals in each predetermined group, the number of rectangles in each predetermined group, and the number of straight lines in each predetermined group.

20. A computer-readable recording medium which records a program for having an information retrieval apparatus execute an information retrieval process comprising:

a handwritten input receiving step for receiving a handwritten input made by a user;

a stroke data set extracting steps for extracting stroke data sets, wherein each stroke data set is a collection of data representing strokes in the handwritten input made by the user;

a storage step for storing each extracted stroke data set;

an identifier assigning step for assigning a group identifier to the stroke data sets in predetermined groups, wherein each predetermined group of stroke data sets is stored together with a corresponding group identifier;

a design input receiving step for receiving at least one handwritten design input from the user;

a design stroke data set extracting step for extracting a design stroke data set from each handwritten design input, wherein each design stroke data set is a collection of data representing strokes in a handwritten deign input;

a design stroke data set storage step for storing design stroke data sets extracted in the design stroke data set extracting step;

a design characteristic extracting step for extracting characteristics of each design stroke data set stored in the design stroke data set storage step;

a design appending step for appending each design stroke data set to one of the predetermined groups, in accordance with an indication given by the user;

a design management information generating step for generating design management information that associates each design stroke data set with the characteristics of the design stroke data set, and the group identifier corresponding to the predetermined group to which each design stroke data set has been appended;

a design management information storage step for storing the design management information;

a retrieval design input receiving step for receiving a handwritten retrieval design input from the user;

a retrieval design stroke data set extracting step for extracting a retrieval design stroke data set from the handwritten retrieval design input, wherein the retrieval design stroke data set is a collection of data representing strokes in the retrieval design input;

a retrieval design characteristic extracting step for extracting characteristics of the retrieval design stroke data set;

a design selection step for comparing the characteristics of each design stroke data set stored in the design management information storage step with the characteristics of the retrieval design stroke data set, and for selecting at least one of the design stroke data sets according to the degree of similarity between the characteristics of each design stroke data set and the characteristics of the retrieval design stroke data set;

a selected identifier extracting step for extracting the group identifiers corresponding to the predetermined groups to which the design stroke data sets selected in the design selection step have been appended; and a display step for displaying the stroke data sets in the predetermined groups corresponding to the group identifiers extracted in the selected identifier extracting step.

* * * * *